United States Patent
Namgoong et al.

(10) Patent No.: US 11,616,541 B1
(45) Date of Patent: Mar. 28, 2023

(54) NON-LINEAR PRECODING FOR MULTI-USER MULTIPLE-INPUT MULTIPLE-OUTPUT

(71) Applicant: QUALCOMM Incorporated, San Diego, CA (US)

(72) Inventors: June Namgoong, San Diego, CA (US); Taesang Yoo, San Diego, CA (US); Wei Yang, San Diego, CA (US); Hyojin Lee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/537,327

(22) Filed: Nov. 29, 2021

(51) Int. Cl.
- *H04B 7/0456* (2017.01)
- *H04B 7/0452* (2017.01)
- *H04L 27/34* (2006.01)
- *H04B 7/06* (2006.01)
- *H04L 27/20* (2006.01)

(52) U.S. Cl.
CPC ......... *H04B 7/0456* (2013.01); *H04B 7/0452* (2013.01); *H04B 7/0634* (2013.01); *H04B 7/0695* (2013.01); *H04L 27/2082* (2013.01); *H04L 27/3483* (2013.01)

(58) Field of Classification Search
CPC .. H04B 7/0456; H04B 7/0452; H04B 7/0634; H04B 7/0695; H04L 27/2082; H04L 27/3483
See application file for complete search history.

(56) References Cited

U.S. PATENT DOCUMENTS

| | | | |
|---|---|---|---|
| 10,355,763 | B2 | 7/2019 | Kim et al. |
| 2010/0254473 | A1 | 10/2010 | Wu et al. |
| 2016/0294454 | A1* | 10/2016 | Onggosanusi ....... H04B 7/0626 |
| 2020/0106491 | A1* | 4/2020 | Wu ....................... H04B 7/0417 |
| 2021/0194559 | A1* | 6/2021 | Li ......................... H04B 7/0663 |

FOREIGN PATENT DOCUMENTS

| | | |
|---|---|---|
| JP | 2016533098 A | 10/2016 |
| WO | WO-2014033515 A1 | 3/2014 |

* cited by examiner

*Primary Examiner* — Vineeta S Panwalkar
(74) *Attorney, Agent, or Firm* — Holland & Hart LLP

(57) ABSTRACT

Methods, systems, and devices for wireless communications are described. A base station may associate a first port and a second port each with a set of antenna elements based on a first and a second linear precoding vector, where the phases of the ports are coherent. The base station may generate coefficients indicating a first combination and a second combination of a first data set for a first user equipment (UE) and a second data set for a second UE. In some cases, the base station may apply the first linear precoding vector to the first combination, apply the second linear precoding vector to the second combination, and transmit the first combination using a first transmission beam corresponding to the first port and the second combination using a second transmission beam corresponding to the second port to the first and second UEs.

30 Claims, 13 Drawing Sheets

NON-LINEAR PRECODING FOR MULTI-USER MULTIPLE-INPUT MULTIPLE-OUTPUT

FIELD OF TECHNOLOGY

The following relates to wireless communications, including non-linear precoding for multi-user (MU) multiple-input multiple-output (MIMO) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support non-linear precoding for multi-user (MU) multiple-input multiple-output (MIMO) communications. Generally, the described techniques provide for a base station to utilize an enhanced precoding scheme for shared channel data transmissions to two user equipments (UEs). In some cases, the described techniques may increase the received signal power for the transmission to a second UE, as the base station may transmit data to a first UE under low signal-to-noise ratio (SNR) conditions. The base station may associate a first port for a shared channel transmission with a set of antenna elements of an antenna array, and a second port for the shared channel transmission with the set of antenna elements of the antenna array. The first port may have a first phase and may be based on a first linear precoding vector, and the second port may be based on a second linear precoding vector and a phase shift such that the second port may have a second phase that is coherent with the first phase. That is, the base station may apply the linear precoding to generate transmissions via the first port and the second port that constructively interfere.

In some examples, the base station may use the first port and the second port to transmit data associated with the first UE and the second UE. For example, the base station may use the first port to transmit, to the first UE and the second UE, a linear combination of a first data set for the first UE and a second data set for the second UE. The base station may use the second port to transmit, to the second UE, a different linear combination of the first data set and the second data set. In some examples, the linear combinations of the first data set and the second data set may be computed by a neural network and based on channel conditions. Additionally or alternatively, a constellation (e.g., a component constellation) associated with the second data set transmitted to the second UE may be conditional on a value of data in the first data set transmitted to the first UE. That is, the base station may adjust the constellation of the data for the second UE based on a value of the data for the first UE to enable the constructive interference between the transmissions from the first port and the second port when received by the second UE, which may improve the reliability of data reception for the data transmitted to the second UE.

A method is described. The method may include associating a first port with a set of multiple antenna elements of an antenna array, the first port based on a first linear precoding vector and having a first phase, associating a second port with the set of multiple antenna elements of the antenna array, the second port based on a second linear precoding vector and a phase shift such that the second port has a second phase that is coherent with the first phase, applying the first linear precoding vector to a first input that includes a first combination of a first data set for a first UE and a second data set for a second UE, applying the second linear precoding vector to a second input that includes a second combination of the first data set for the first UE and the second data set for the second UE, and transmitting, using a first transmission beam corresponding to the first port and a second transmission beam corresponding to the second port, the first combination and the second combination.

An apparatus is described. The apparatus may include a processor, memory coupled with the processor, and instructions stored in the memory. The instructions may be executable by the processor to cause the apparatus to associate a first port with a set of multiple antenna elements of an antenna array, the first port based on a first linear precoding vector and having a first phase, associate a second port with the set of multiple antenna elements of the antenna array, the second port based on a second linear precoding vector and a phase shift such that the second port has a second phase that is coherent with the first phase, apply the first linear precoding vector to a first input that includes a first combination of a first data set for a first UE and a second data set for a second UE, apply the second linear precoding vector to a second input that includes a second combination of the first data set for the first UE and the second data set for the second UE, and transmit, using a first transmission beam corresponding to the first port and a second transmission beam corresponding to the second port, the first combination and the second combination.

Another apparatus is described. The apparatus may include means for associating a first port with a set of multiple antenna elements of an antenna array, the first port based on a first linear precoding vector and having a first phase, means for associating a second port with the set of multiple antenna elements of the antenna array, the second port based on a second linear precoding vector and a phase shift such that the second port has a second phase that is coherent with the first phase, means for applying the first linear precoding vector to a first input that includes a first combination of a first data set for a first UE and a second data set for a second UE, means for applying the second linear precoding vector to a second input that includes a second combination of the first data set for the first UE and the second data set for the second UE, and means for transmitting, using a first transmission beam corresponding to the first port and a second transmission beam corresponding to the second port, the first combination and the second combination.

A non-transitory computer-readable medium storing code is described. The code may include instructions executable by a processor to associate a first port with a set of multiple antenna elements of an antenna array, the first port based on a first linear precoding vector and having a first phase, associate a second port with the set of multiple antenna elements of the antenna array, the second port based on a second linear precoding vector and a phase shift such that the second port has a second phase that is coherent with the first phase, apply the first linear precoding vector to a first input that includes a first combination of a first data set for a first UE and a second data set for a second UE, apply the second linear precoding vector to a second input that includes a second combination of the first data set for the first UE and the second data set for the second UE, and transmit, using a first transmission beam corresponding to the first port and a second transmission beam corresponding to the second port, the first combination and the second combination.

In some examples of the method, apparatuses, and non-transitory computer-readable medium described herein, the first transmission beam constructively interferes with the second transmission beam based on the second phase of the second port being coherent with the first phase of the first port.

Some examples of the method, apparatuses, and non-transitory computer-readable medium described herein may further include operations, features, means, or instructions for adjusting a constellation of the second data set based on the first data set.

In some examples of the method, apparatuses, and non-transitory computer-readable medium described herein, the adjusting may include operations, features, means, or instructions for adjusting a constellation of each symbol of the second data set based on a corresponding value indicated by each respective symbol of the first data set.

In some examples of the method, apparatuses, and non-transitory computer-readable medium described herein, a first constellation of the first data set includes a first quadrature phase-shift keying (QPSK) constellation and the constellation of the second data set may be a second constellation and includes a second QPSK constellation, where the adjusting of the second constellation of the second data set includes adjusting a labeling of the second QPSK constellation based on the first data set.

Some examples of the method, apparatuses, and non-transitory computer-readable medium described herein may further include operations, features, means, or instructions for generating, based on one or more channel metrics, a first set of coefficients indicating the first combination of the first data set and the second data set, where the applying of the first linear precoding vector may be based on the generating of the first set of coefficients and generating, based on the one or more channel metrics, a second set of coefficients indicating the second combination of the first data set and the second data set, where the applying of the second linear precoding vector may be based on the generating of the second set of coefficients.

In some examples of the method, apparatuses, and non-transitory computer-readable medium described herein, the generating of the first set of coefficients and the generating of the second set of coefficients may be based on an application of a neural network whose inputs include the one or more channel metrics.

In some examples of the method, apparatuses, and non-transitory computer-readable medium described herein, the one or more channel metrics includes an estimate of a downlink precoded channel, a downlink SNR, a noise covariance expected at the downlink precoded channel, or a combination thereof.

In some examples of the method, apparatuses, and non-transitory computer-readable medium described herein, the transmitting may include operations, features, means, or instructions for transmitting, using the first transmission beam corresponding to the first port, on a first portion of a precoded channel generated by applying the first linear precoding vector to a propagation channel and transmitting, using the second transmission beam corresponding to the second port, on a second portion of the precoded channel generated by applying the second linear precoding vector to the propagation channel.

In some examples of the method, apparatuses, and non-transitory computer-readable medium described herein, the precoded channel may be a two-by-two spatially-causal channel based on the second port having the second phase that may be coherent with the first phase.

DETAILED DESCRIPTION

Figure 1:
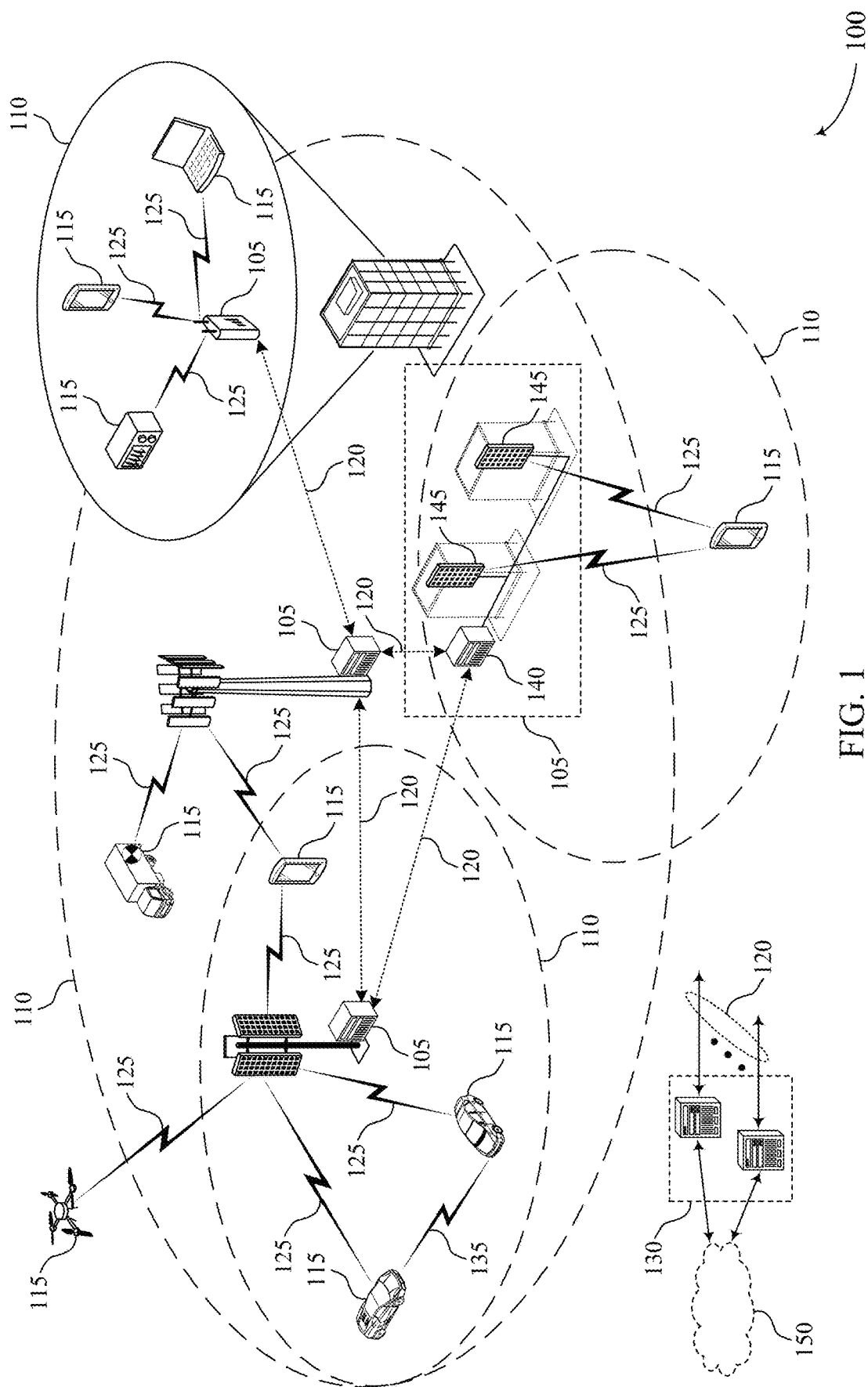
FIG. 1 illustrates an example of a wireless communications system that supports non-linear precoding for multi-user (MU) multiple-input multiple-output (MIMO) communications in accordance with aspects of the present disclosure.

In some wireless communications systems (e.g., multiple-input multiple-output (MIMO) systems, multi-user (MU) MIMO (MU-MIMO) systems), a base station may use nonlinear precoding, such as Tomlinson-Harashima Precoding (THP). In some examples of nonlinear precoding, the base station may create two ports for a shared channel transmission that may include data for two user equipments (UEs). The base station may transmit data to a first UE using a first port, and may apply nonlinear precoding (e.g., THP) prior to transmitting data to a second UE using a second port. By applying the nonlinear precoding to the data prior to transmitting the data to the second UE, the base station may decrease an amount of interference between the transmission to the first UE via the first port and the transmission to the second UE via the second port. However, in cases where the shared channel is associated with a relatively low signal-to-noise ratio (SNR), applying THP prior to transmitting the data via the second port may effectively result in destructive interference with the transmission to the first UE via the first port, thus decreasing the power of the transmission to the first UE via the first port and increasing interference between the transmissions. Additionally, any uncanceled interference (or interference not canceled through the destructive summation of the transmissions) may still remain as noise in the transmission to the second UE via the second port.

Techniques described herein enable a base station to utilize an enhanced precoding scheme for shared channel data transmissions to two UEs. In some cases, the described techniques may increase received signal power for the transmission to a second UE, as the base station may transmit data to a first UE under low SNR conditions. The base station may associate a first port for a shared channel transmission with a set of antenna elements of an antenna array, and a second port for the shared channel transmission with the set of antenna elements of the antenna array. The first port may have a first phase and may be based on a first linear precoding vector, and the second port may be based on a second linear precoding vector and a phase shift such that the second port may have a second phase that is coherent with the first phase. That is, the base station may apply the linear precoding to generate transmissions via the first port and the second port that constructively interfere.

In some examples, the base station may use the first port and the second port to transmit data associated with both the first UE and the second UE. For example, the base station may use the first port to transmit, to the first UE, a linear combination of a first data set for the first UE and a second data set for the second UE, and the base station may use the second port to transmit, to the second UE, a different linear combination of the first data set and the second data set. In some examples, the linear combinations of the first data set and the second data set may be computed by a neural network and based on channel conditions. Additionally or alternatively, a constellation (e.g., a component constellation) associated with the second data set transmitted to the second UE may be conditional on a value of data in the first data set transmitted to the first UE. That is, the base station may adjust the constellation of the data for the second UE based on a value of the data for the first UE to enable the constructive interference between the transmissions from the first port and the second port when received by the second UE, which may improve the reliability of data reception for the data transmitted to the second UE.

Aspects of the disclosure are initially described in the context of wireless communications systems. Aspects of the disclosure are then descried in the context of precoding schemes, component constellations, and process flows. Aspects of the disclosure are further illustrated by and described with reference to apparatus diagrams, system diagrams, and flowcharts that relate to non-linear precoding for MU-MIMO communications.

FIG. 1 illustrates an example of a wireless communications system 100 that supports non-linear precoding for MU-MIMO communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100 (e.g., MIMO systems, MU-MIMO systems), one or more channels of one or more UEs 115 may be highly correlated due to a small spatial separation between the channels. For example, two UEs 115 may be located in close proximity to each other, which may increase interference between the respective channels of the UEs 115 for MU-MIMO transmissions. To reduce the impact of the high correlation, a base station 105 may apply nonlinear precoding techniques such as THP to MU-MIMO transmissions.

In some examples, using THP, the base station 105 may create two ports (e.g., beams) for a shared channel transmission (e.g., a physical downlink shared channel (PDSCH) transmission) that may include data for two UEs 115 each with one layer. For example, the base station 105 may apply a linear precoding that may convert a MU-MIMO channel (e.g., a propagation channel) into a two-by-two spatially-causal precoded channel, effectively creating the two ports (e.g., demodulation reference signal (DMRS) ports) for the shared channel transmission. In some examples, the base station 105 may use a first port to transmit modulation symbols intended for a first UE 115, and the base station 105 may use the second port to transmit symbols precoded by THP to a second UE 115. That is, the base station 105 may transmit data to the first UE 115 using the first port, and may apply THP prior to transmitting data to the second UE 115 using the second port. Since the precoded channel is spatially-causal, the first UE 115 may receive a small to zero amount of the data transmitted from the second port intended for the second UE 115, while the second UE 115 may receive the data transmitted from both the first port intended for the first UE 115 and the second port intended for the second UE 115. However, the base station 105 may apply interference pre-cancellation in the form of the THP precoded symbols to the second UE 115 such that the second UE 115 may receive a reduced amount of interference from the data intended for the first UE 115.

The precoded channel (e.g., HP) may be based on applying some linear precoding to a propagation channel (e.g., H). In some examples, the product of the propagation channel H and the linear precoding may result in the precoded channel $$\text{matrix } HP \approx \begin{bmatrix} l_{1,1} & 0 \\ l_{2,1} & l_{2,2} \end{bmatrix},$$

where H may represent a 2×Nt channel, where Nt may represent a number of physical antennas in an antenna array with $l_{i,i} > 0$, and P may represent some linear precoding matrix, for example, $P = [p_1 \ p_2]$. In some cases, $p_1$ and $p_2$ may be computed from an LQ decomposition (e.g., a decomposition of matrix into the product of a lower triangular matrix (L) and unitary matrix (Q)) of [H βI], where β may represent a regularization factor and I is an identity matrix. In HP, the first column may correspond to transmissions via the first port and the second column may correspond to transmissions via the second port. In addition, the first row in HP may correspond to a channel seen by the first UE 115, and the second row may correspond to a channel seen by the second UE 115. That is, the first UE 115 may see data transmitted from the first port (e.g., $l_{1,1}$, the channel coefficient for the data transmitted from the first port) and may fail to see data transmitted from the second port, while the second UE 115 may see data transmitted from the first port (e.g., $l_{2,1}$, the channel coefficient for the data transmitted from the first port) and the second port (e.g., $l_{2,2}$, the channel coefficient for the data transmitted from the second port).

In some examples, the base station 105 may apply the interference pre-cancellation in the form of the THP to the second port. For example, the base station 105 may apply an input value of $u_2 - \alpha u_1$, where $u_1$ and $u_2$ may represent regular quadrature amplitude modulation (QAM) constellations (e.g., quadrature phase-shift keying (QPSK), 16QAM) and α may represent a pre-cancellation factor computed from an assumed channel (e.g., $l_{2,1}$) for the interfering signal from the first port received by the second UE 115 and an SNR (e.g., or a noise covariance matrix) associated with the assumed channel for the second UE. In some examples, $u_2$ may include modulation symbols carrying a message for the second UE 115. As such, the input value $u_2 - \alpha u_1$ may indicate the interference pre-cancellation by cancelling a fraction of $u_1$ from $u_2$ before $u_2$ is applied to the second port and the linear precoding. In some cases, $u_1$ may include the modulation symbols for the first UE 115. In some examples, the base station 105 may apply a modulo operation (e.g., Mod) to an I-phase and a Q-phase of the input value $u_2 - \alpha u_1$, which may result in the input to the second port. In some cases with a finite SNR, partial pre-cancellation may be used, and in cases with a low SNR, the base station 105 may choose α such that the base station 105 may refrain from applying a modulo operation to the input value.

In some examples, the first port may have an input value of $u_1$, which may be a direct input value to the first port (e.g., DMRS port 1, the propagation channel for the first UE 115). The base station 105 may apply the linear precoding matrix $P = [p_1 \ p_2]$ to form the first port and the second port (e.g., DMRS port 2, the propagation channel for the second UE 115), and the base station 105 may use the first port to transmit the modulation symbols to the first UE 115 and the second port to transmit the THP precoded symbols to the second UE 115. THP precoding may introduce a shaping loss in high SNR scenarios (e.g., 1.53 dB), a modulo loss in low SNR scenarios, and a power loss at low order modulation (e.g., QPSK). That is, for cases with a high SNR, a dominant source of loss for THP precoding may be shaping loss, and for cases with a low SNR, a dominant source of loss for THP precoding may be power and modulo losses in addition to shaping loss. In some examples, the losses may be mitigated by scaling a at the base station 105 (e.g., by using a partial interference pre-cancellation), by disabling modulo operations at a UE 115, by utilizing maximum-likelihood decoding, or any combination thereof. However, any interference the base station 105 fails to cancel may still remain as noise to the UE 115 for which the THP is applied (e.g., the second UE 115). As such, in cases with a low SNR, applying the THP prior to transmitting data via the second port may lack performance benefits over optimized linear precoding such as regularized zero-forcing precoding.

In some cases, a base station 105 may use an enhanced precoding scheme for shared channel data transmissions to two UEs 115. In some cases, the described techniques may increase received signal power for the transmission to a second UE 115, as the base station 105 may transmit data to a first UE 115 under low SNR conditions. The base station 105 may associate a first port for a shared channel transmission with a set of antenna elements of an antenna array, and a second port for the shared channel transmission with the set of antenna elements of the antenna array. The first port may have a first phase and may be based on a first linear precoding vector, and the second port may be based on a second linear precoding vector and a phase shift such that the second port may have a second phase that is coherent with the first phase. That is, the base station 105 may apply the linear precoding to generate transmissions via the first port and the second port that constructively interfere.

In some examples, the base station 105 may use the first port and the second port to transmit data associated with both the first UE 115 and the second UE 115. For example, the base station 105 may use the first port to transmit a linear combination of a first data set for the first UE 115 and a second data set for the second UE 115 to the first UE 115 and the second UE 115, and the base station 105 may use the second port to transmit a different linear combination of the first data set and the second data set to the second UE 115. In some examples, the linear combinations of the first data set and the second data set may be computed by a neural network and based on channel conditions. Additionally or alternatively, a constellation (e.g., a component constellation) associated with the second data set transmitted to the second UE 115 may be conditional on a value of data in the first data set transmitted to the first UE 115. That is, the base station 105 may adjust the constellation of the data for the second UE 115 based on a value of the data for the first UE 115 to enable the constructive interference between the transmissions from the first port and the second port when received by the second UE 115, which may improve the reliability of data reception for the data transmitted to the second UE 115.

Figure 2:
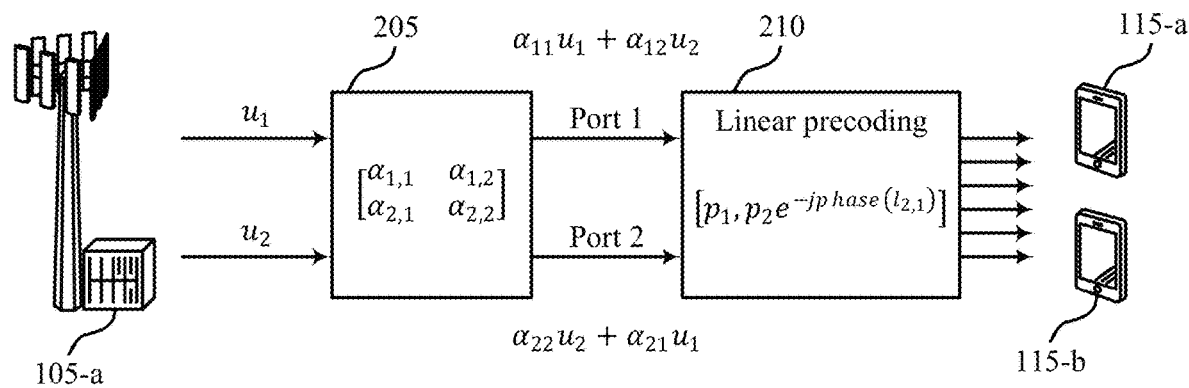
FIG. 2 illustrates an example of a precoding scheme that supports non-linear precoding for MU-MIMO communications in accordance with aspects of the present disclosure.

FIG. 2 illustrates an example of a precoding scheme 200 that supports non-linear precoding for MU-MIMO communications in accordance with aspects of the present disclosure. In some examples, the precoding scheme 200 may implement aspects of the wireless communications system 100 or may be implemented by aspects of the wireless communications system 100. The precoding scheme 200 may include a component constellation $u_1$ and a component constellation $u_2$, which may correspond to data a base station 105-*a* may transmit to a UE 115-*a* and a UE 115-*b*, respectively. Additionally or alternatively, the precoding scheme 200 may include a linear transformation matrix 205 and a linear precoding matrix 210.

The precoding scheme 200 may support enhanced precoding for shared channel data transmissions to the UEs 115. In some examples, the base station 105-*a* may associate a port 1 (e.g., a first port) with a set of antenna elements of an antenna array, where the port 1 may have a first phase based on a first linear precoding vector. The port 1 may be associated with a propagation channel, and the base station 105-*a* may apply the first linear precoding vector to the propagation channel such that the propagation channel becomes a precoded channel. Additionally or alternatively, the port 1 may be associated with the component constellation $u_1$ for transmitting data to the UE 115-*a*. In some examples, the base station 105-*a* may associate a port 2 (e.g., a second port) with the set of antenna elements of the antenna array, where the port 2 may be based on a second linear precoding vector. The port 2 may be associated with the propagation channel, and the base station 105-*a* may apply the second linear precoding vector to the propagation channel such that the propagation channel becomes a precoded channel (e.g., HP). Additionally or alternatively, the port 2 may be associated with the component constellation $u_2$ for transmitting data to the UE 115-*b*. In some cases, the port 2 may have a phase shift such that the port 2 has a second phase that is coherent with (e.g., constructively interferes with) the first phase. As such, the precoded channel may be a two-by-two spatially-causal channel based on the port 2 having the second phase that is coherent with the first phase.

In some cases, the base station 105-*a* may use the component constellation $u_1$ and the component constellation $u_2$ to communicate messages to the UE 115-*a* and the UE 115-*b*, respectively, where $u_1$ may be from a regular QPSK constellation and $u_2$ may be from a QPSK constellation that depends on $u_1$. In some examples, the component constellation $u_1$ may be associated with the first data set for the UE 115-*a* and the component constellation $u_2$ may be associated with the second data set for the UE 115-*b*. As described with reference to FIG. 3, the base station 105-*a* may transmit different constellation points of the constellation component $u_1$ to the UE 115-*a*, and the base station 105-*a* may transmit different constellation points of the component constellation $u_2$ to the UE 115-*b* based on the constellation points transmitted to the UE 115-*a*.

In some examples, the base station 105-*a* may generate a first set of coefficients indicating the first combination of the first data set and the second data set, and a second set of coefficients indicating the second combination of the first data set and the second data set based on one or more channel metrics. For example, the base station 105-*a* may apply a linear transformation matrix 205 to the component constellation $u_1$ and the component constellation $u_2$. The linear transformation matrix 205 may be given as $$\begin{bmatrix} \alpha_{1,1} & \alpha_{1,2} \\ \alpha_{2,1} & \alpha_{2,2} \end{bmatrix},$$

where $\alpha_{i,j} > 0$ may represent linear combining coefficients for a first data set for the UE 115-*a* and a second data set for the UE 115-*b*, and where $\alpha_{i,j}$ may be determined from the propagation channel H (e.g., an assumed downlink channel) and an SNR corresponding to the propagation channel H, or by a neural network. Applying the linear transformation matrix 205 may result in linear combinations of contributions (e.g., data) from the component constellation $u_1$ and the component constellation $u_2$ corresponding to the port 1 and the port 2. For example, the output of the linear transformation matrix 205 may be $\alpha_{11}u_1 + \alpha_{12}u_2$ for the port 1 and $\alpha_{22}u_2 + \alpha_{21}u_1$ for the port 2, where each coefficient in the linear combinations may be a positive, real number. For example, the linear combination $\alpha_{11}u_1 + \alpha_{12}u_2$ corresponding to the port 1 may include a first combination of the first data set for the UE 115-*a* (e.g., $\alpha_{11}u_1$) and the second data set for the UE 115-*b* (e.g., $\alpha_{12}u_2$), and the linear combination $\alpha_{22}u_2 + \alpha_{21}u_1$ corresponding to the port 2 may include a second combination of the first data set for the UE 115-*a* (e.g., $\alpha_{21}u_1$) and the second data set for the UE 115-*b* (e.g., $\alpha_{22}u_2$).

In some cases, the base station 105-*a* may use a neural network to compute the linear combination coefficients $\alpha_{i,j}$, where the inputs to the neural network may include the one or more channel metrics. For example, channel state information at the transmitter (CSIT) (e.g., at the base station 105) may be input to a neural network (e.g., a multi-layer perception (MLP)) to compute $\alpha_{i,j}$, which are used to compute the inputs for the port 1 and the port 2 (e.g., the linear combinations of the contributions from the component constellation $u_1$ and the component constellation $u_2$). Additionally or alternatively, CSIT may be used for training data generation and the generated training data can be input to a backpropagation-based solver to compute $\alpha_{i,j}$. In some examples, the channel metrics (e.g., the CSIT) may include an estimate of the precoded channel HP, a downlink SNR, a noise covariance expected at downlink precoded channel, or any combination thereof.

In some cases, the base station 105-*a* may apply the linear precoding matrix 210 to the linear combinations of the contributions from the component constellation $u_1$ and the component constellation $u_2$. For example, the base station 105-*a* may apply a first linear precoding vector of the linear precoding matrix 210 (e.g., $p_1$) to a first input (e.g., $\alpha_{11}u_1 + \alpha_{12}u_2$ corresponding to the port 1) and a second linear precoding vector of the linear precoding matrix 210 (e.g., $p_2 e^{jphase(l_{2,1})}$) to a second input (e.g., $\alpha_{22}u_2 + \alpha_{21}u_1$ corresponding to the port 2). Put another way, $p_1(\alpha_{11}u_1 + \alpha_{12}u_2)$ and $p_2 e^{jphase(l_{2,1})}(\alpha_{22}u_2 + \alpha_{21}u_1)$ may be input to the same set of antenna elements. The linear precoding matrix 210 may be given as $[p_1 \;\; p_2 e^{jphase(l_{2,1})}]$, where $p_1$ and $p_2$ may be computed from an LQ decomposition of the downlink channel H to make H a spatially-causal channel, where $$HP = H\begin{bmatrix} p_1 & p_2 e^{jphase(l_{2,1})} \end{bmatrix} = \begin{bmatrix} l_{1,1} & 0 \\ l_{2,1} & l_{2,2} e^{jphase(l_{2,1})} \end{bmatrix},$$

$l_{i,i} > 0$ (e.g., $l_{1,1}$ and $l_{2,2}$ are positive and real valued). In some examples, $e^{jphase(l_{2,1})}$ may represent a phase rotation used to match the phase of the contribution from the port 2 to the phase of an interfering channel (e.g., the channel coefficient for the port 1, $l_{2,1}$) such that the contributions from both ports add coherently (e.g., constructively interfere) at the UE 115-*b*. The first phase of the first port may be given by the phase of $l_{2,1}$, and the second phase of the second port may be given by the phase of $l_{2,2}e^{jphase(l_{2,1})}$. For example, the base station 105-*a* may apply the linear precoding in the form of $p_1$ to the port 1 and the linear precoding in the form of $p_2 e^{jphase(l_{2,1})}$ to the port 2, which may turn the propagation channel H (e.g., a downlink MU-MIMO channel) into a two-by-two spatially-causal channel, effectively creating the two ports for PDSCH transmissions.

In some examples, the base station 105-*a* may transmit the first and second combinations of the first data set and the second data set (e.g., the first input and the second input) to both the UE 115-*a* and the UE 115-*b*, after applying the linear precoding matrix 210. For example, the base station 105-*a* may use a first transmission beam corresponding to the port 1 to transmit the first input (e.g., $\alpha_{11}u_1+\alpha_{12}u_2$) to the UE 115-*a* and the UE 115-*b*, and a second transmission beam corresponding to the port 2 to transmit the second input (e.g., $\alpha_{21}u_1+\alpha_{22}u_2$) to the UE 115-*b*. Additionally or alternatively, the base station 105-*a* may transmit on a first portion of the precoded channel (e.g., HP) generated by applying the first linear precoding vector (e.g., $p_1$) to the propagation channel (e.g., H) using the first transmission beam corresponding to the port 1. The first portion of the precoded channel may correspond to the first column of HP_given by a vector $$\begin{bmatrix} h_{1,1} \\ l_{2,1} \end{bmatrix}.$$

The transmission from the port 1 may reach both the UE 115-*a* and the UE 115-*b*. The base station 105-*a* may transmit on a second portion of the precoded channel (e.g., HP) generated by applying the second linear precoding vector (e.g., $p_2 e^{jphase(l_{2,1})}$) to the propagation channel (e.g., H) using the second transmission beam corresponding to the port 2. The second portion of the precoded channel may correspond to the second column of HP, given by a vector $$\begin{bmatrix} 0 \\ l_{2,2}e^{jphase(l_{2,1})} \end{bmatrix}.$$

The transmission from the port 2 may reach the UE 115-*b*. In some examples, the precoded channel HP may be the two-by-two spatially-causal channel based on the port 2 having the second phase (e.g., the phase of the channel coefficient $l_{2,2}e^{jphase(l_{2,1})}$) that is coherent with the first phase (e.g., the phase of the channel coefficient $l_{2,1}$).

Figure 3:
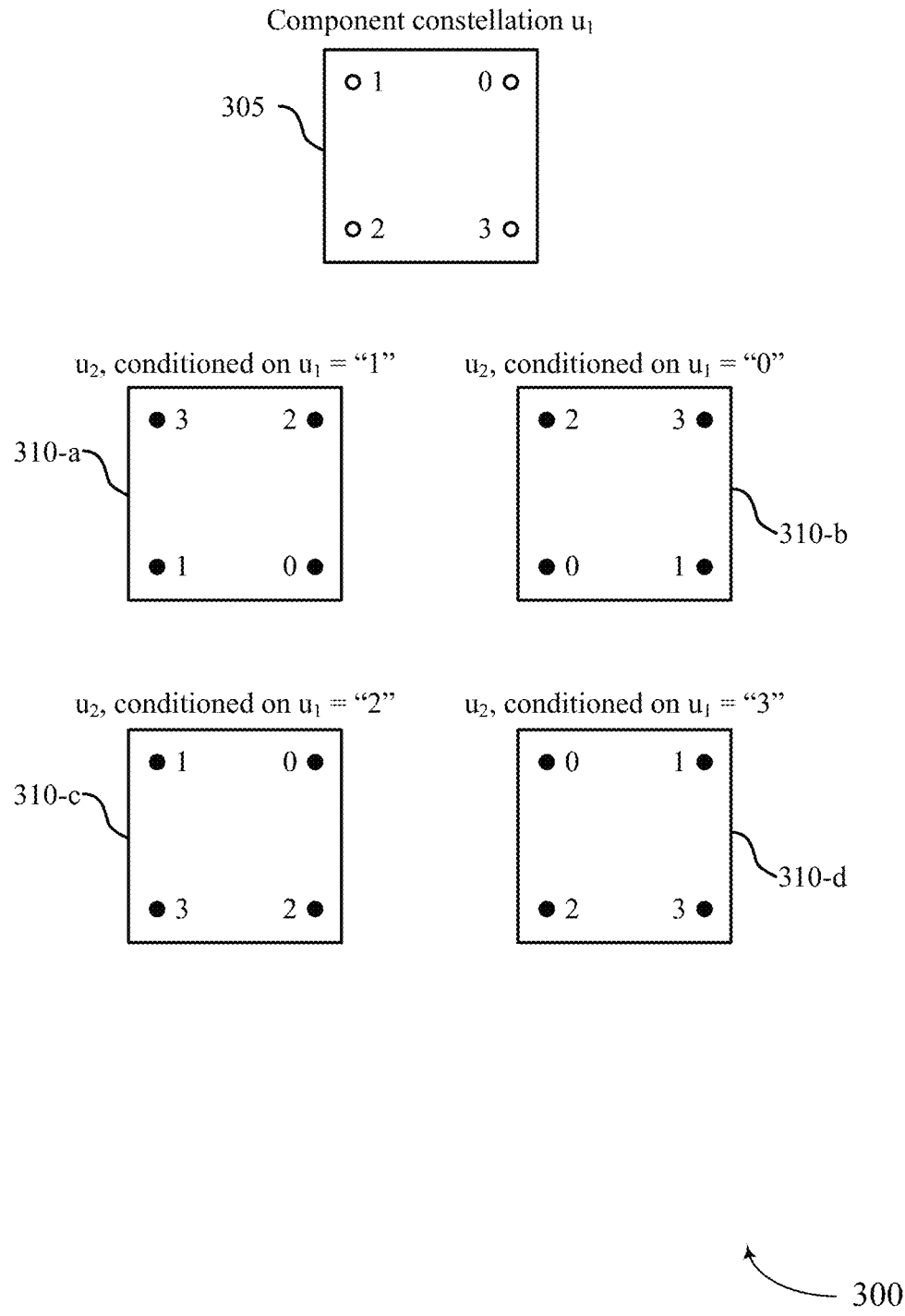
FIG. 3 illustrates examples of component constellations that support non-linear precoding for MU-MIMO communications in accordance with aspects of the present disclosure.

FIG. 3 illustrates an example of a component constellation 300 that supports non-linear precoding for MU-MIMO communications in accordance with aspects of the present disclosure. In some examples, the component constellation 300 may implement aspects of the wireless communications system 100 or may be implemented by aspects of the wireless communications system 100.

As described herein, a base station may use an enhanced precoding scheme for shared channel data transmissions to two UEs. In some examples, the base station 105-*a* may use different component constellations $u_1$ and $u_2$ to communicate messages to two UEs. For example, the base station may use a component constellation 305 (e.g., a component constellation $u_1$) to communicate with a first UE, where $u_1$ may be from a regular QPSK constellation, and the base station may use a component constellation 310 (e.g., a component constellation $u_2$) to communicate with a second UE, where $u_2$ may be from a QPSK constellation that depends on $u_1$. That is, what the base station transmits to the second UE may depend on what the base station transmits to the first UE. In some examples, the component constellation 305 may be associated with a first data set (e.g., including modulation symbols) for the first UE, and the component constellation 310 may be associated with a second data set (e.g., including modulation symbols) for the second UE.

The component constellation 305 may include four constellation points (e.g., 0, 1, 2, 3), each of which the base station may use to transmit a message to the first UE. For example, the base station may send a message 0 to the first UE using a constellation point 0, a message 1 using a constellation point 1, a message 2 using a constellation point 2, and a message 3 using a constellation point 3. That is, the base station may send one of the four constellation points to the first UE based on the message the base station may select to send. In some cases, the component constellation 305 may be a regular QPSK constellation, where the base station may transmit one of the four constellation points in the component constellation 305 according to the message that is intended for the first UE.

In some cases, the base station may transmit messages to the second UE using a component constellation 310 which may be based on the constellation point from the component constellation 305 the base station used to transmit a message to the first UE. For example, the base station may adjust the component constellation 310 based on the first data set (e.g., the component constellation $u_1$).

In some examples, the base station may use a component constellation 310-*a* which may represent a component constellation $u_2$ conditioned on $u_1$="1," a component constellation 310-*b* which may represent a component constellation $u_2$ conditioned on $u_1$="0," a component constellation 310-*c* which may represent a component constellation $u_2$ conditioned on $u_1$="2," and a component constellation 310-*d* which may represent a component constellation $u_2$ conditioned on $u_1$="3." The base station may adjust (e.g., use) each modulation symbol of the second data set (e.g., $u_2$) based on a corresponding value indicated by each respective symbol of the first data set (e.g., $u_1$). For example, if the base station transmits a message 1 to the first UE using the constellation point 1 from the component constellation 305 (e.g., $u_1$="1"), then the base station may transmit a message to the second UE using one of the four constellation points in the component constellation 310-*a* which is conditioned on $u_1$="1." If the base station transmits a message 0 to the first UE using the constellation point 0 from the component constellation 305 (e.g., $u_1$="0"), then the base station may transmit a message to the second UE using one of the four constellation points in the component constellation 310-*b* which is conditioned on $u_1$="0," and so on.

In some examples, the four component constellations 310 may each be a regular QPSK component constellation with a distinct message labeling that may correspond to a distinct message transmitted to the first UE. For example, the base station may use a particular component constellation 310 based on which component constellation 310 corresponds to the message transmitted to the UE. In some examples, where the component constellation 305 (e.g., corresponding to the first data set) includes a QPSK constellation and a component constellation 310 (e.g., corresponding to the second data set) includes a second QPSK constellation, the base station may adjust the component constellation 310 by adjusting a labeling of the component constellation 310 based on the first data set.

In some examples, the input to the port 1 may be a linear combination of a first modulation symbol from the component constellation 305 (e.g., a first constellation point) and a second modulation symbol from a component constellation 310 conditioned on the first modulation symbol (e.g., a second constellation point conditioned on the first constellation point). That is, the input to the port 1 may be a combination of a first data set corresponding to the first UE and a second data set corresponding to the second UE. Additionally or alternatively, the input to the port 2 may be a different linear combination of a first modulation symbol from the component constellation 305 (e.g., a first constellation point) and a second modulation symbol from a component constellation 310 conditioned on the first modulation symbol (e.g., a second constellation point conditioned on the first constellation point). That is, the input to the port 1 may be a different combination of a first data set corresponding to the first UE and a second data set corresponding to the second UE.

As described with reference to FIG. 2, the base station may use the component constellation 305 and a component constellation 310 to transmit messages to the first UE and the second UE, respectively. The component constellation 305 (e.g., $u_1$) and the component constellation 310 (e.g., $u_2$) may correspond to a first UE and a second UE, respectively, and may be input to a linear transformation matrix followed by a linear precoding matrix before being transmitted to the UEs.

Figure 4:
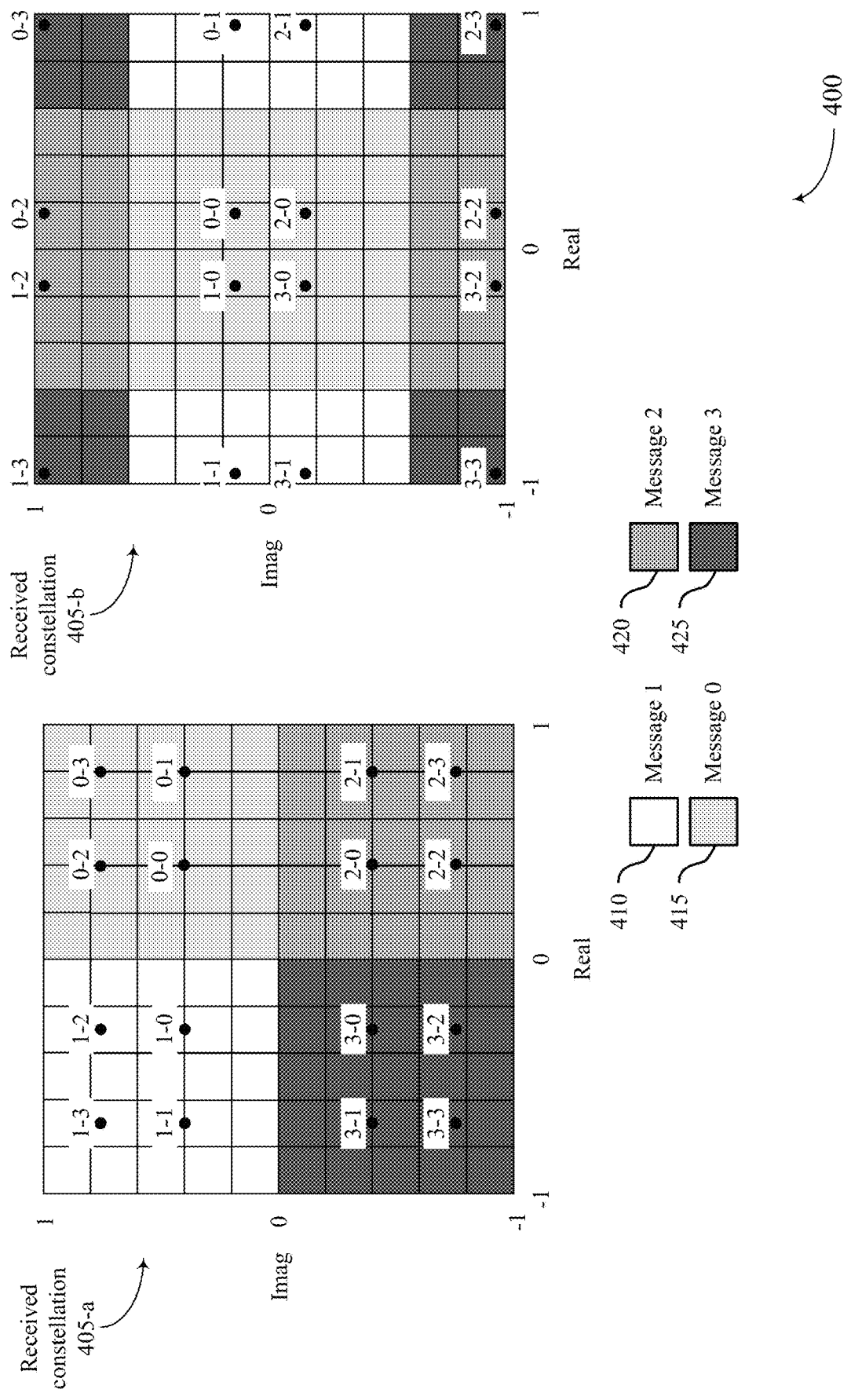
FIG. 4 illustrates examples of received constellations that support non-linear precoding for MU-MIMO communications in accordance with aspects of the present disclosure.

FIG. 4 illustrates an example of a received constellation 400 that supports non-linear precoding for MU-MIMO communications in accordance with aspects of the present disclosure. The received constellation 400 may include a received constellation 405-a received by the first UE (e.g., UE1) and a received constellation 405-b received by a second UE (e.g., UE2).

As described herein, a base station may use an enhanced precoding scheme for shared channel data transmissions to two UEs. For example, the base station may use a component constellation $u_1$ and a component constellation $u_2$ to transmit messages to a first UE and a second UE. The first UE may receive the received constellation 405-a and the second UE may receive the received constellation 405-b.

In some examples, a channel corresponding to the first UE (e.g., UE1 channel) and a channel corresponding to the second UE (e.g., UE2 channel) may be in close spatial proximity to each other such that the angle between the two channels may be small. In some cases, the port 1 and the port 2 (e.g., corresponding to channels used for transmissions to the UEs) may be formed from an LQ composition of a downlink channel (e.g., H, as described with reference to FIGS. 2 and 3). In some examples, the port 1 may be directly aligned with the channel for the first UE. However, the port 2 may be orthogonal to the port 1, and as such, the port 2 may be misaligned with the channel for the second UE (e.g., as the channels for the first and second UEs are separated by a small angle).

In some cases, when the channels for the first UE and second UE are close together, and when the port 1 and the port 2 are orthogonal, the second UE may see a contribution from a signal intended for (e.g., transmitted to) the first UE using the port 1 in addition to the signal intended for (e.g., transmitted to) the second UE using the port 2. That is, the signal transmitted to the first UE using the port 1 may have a large contribution to the second UE. In some cases, to prevent the second UE from seeing the signal intended for the first UE as noise, a base station may use a hierarchical modulation scheme to use the signal intended for the first UE in a constructive way in delivering a message to the second UE using the port 2. In some examples, the second UE may receive both the $u_1$ component and the $u_2$ component from the port 1 and the port 2 with a large power to maximize a distance between hypotheses for each of two bits (e.g., bit=0 and bit=1). For example, each UE may receive two bits. For the highly correlated channels corresponding to the first UE and the second UE, the port 2 may be less efficient than the port 1 in delivering power. As such, the base station may transmit the component constellation $u_2$ corresponding to the second UE on the port 1 in addition to the component constellation $u_1$ to the extent that an overall mutual information delivered to both UEs is maximized. That is, to maximize the amount of information transmitted to the second UE, the base station may maximize the distance between the hypotheses for each of the two bits, which may be determined by a received power in the component constellations $u_1$ and $u_2$.

The received constellation 405-a for the first UE (e.g., UE1) and the received constellation 405-b for the second UE (e.g., UE2) may each include multiple received constellation points denoted by the labels x and y (e.g., denoted as the composite labels x-y in FIG. 4). The received constellation points may correspond to a message the base station may transmit to the first UE and the second UE. For example, the received constellation 405-a may illustrate the composite constellation points the first UE may receive, and the received constellation 405-b may illustrate the composite constellation points the second UE may receive. As described with reference to FIG. 3, the label x may correspond to a message transmitted to the first UE via a given constellation point (e.g., x={0, 1, 2, 3}) and the label y may correspond to a message transmitted to the second UE via a given constellation point based on the message transmitted to the first UE (e.g., y={0, 1, 2, 3}). Because each UE may receive two bits, each UE may receive four possible messages (e.g., 0, 1, 2, 3). For both the received constellation 405-a and the received constellation 405-b, a constellation point in a decision region 410 may correspond to a message 1, a constellation point in a decision region 415 may correspond to a message 0, a constellation point in a decision region 420 may correspond to a message 2, and a constellation point in a decision region 425 may correspond to a message 3.

Additionally or alternatively, the labels x-y in the received constellation 405-a and the received constellation 405-b may indicate which message the first UE and the second UE may receive. For example, a received constellation point with a label 1-3 in the received constellation 405-a and the received constellation 405-b may indicate that the first UE may receive a message 1 corresponding to bits 01 and the second UE may receive a message 3 corresponding to bits 11 via the indicated constellation point with the label 1-3. In some cases, a received constellation point with a label 2-1 in the received constellation 405-a and the received constellation 405-b may indicate that the first UE may receive a message 2 and the second UE may receive a message 1 via the indicated constellation point with the label 2-1.

As shown in the received constellation 405-b for the second UE, the base station may transmit a message 0 to the second UE, which may correspond to one of the received constellation points with a label 0-0, 1-0, 2-0, or 3-0 in the decision region 415 based on which constellation point (e.g., 0, 1, 2, or 3) was transmitted to the first UE, or the base station may transmit a message 3 to the second UE, which may correspond to one of the received constellation points with a label 0-3, 1-3, 2-3, or 3-3 in the decision region 425 based on which constellation point (e.g., 0, 1, 2, 3) was transmitted to the first UE.

In some examples, interference (e.g., by means of phase alignment) from the port 1 (e.g., a message intended for the first UE) may be constructively added to what is received from the port 2 to construct the received constellation 405-b intended for the second UE. That is, the contribution from the port 1 seen by the second UE may be added constructively to the contribution from the port 2 seen by the second UE rather than being disregarded as noise. As such, the received constellation 405-b may achieve a performance gain at low SNR (e.g., ≤8 dB) and sufficiently high channel correlation.

Figure 5:
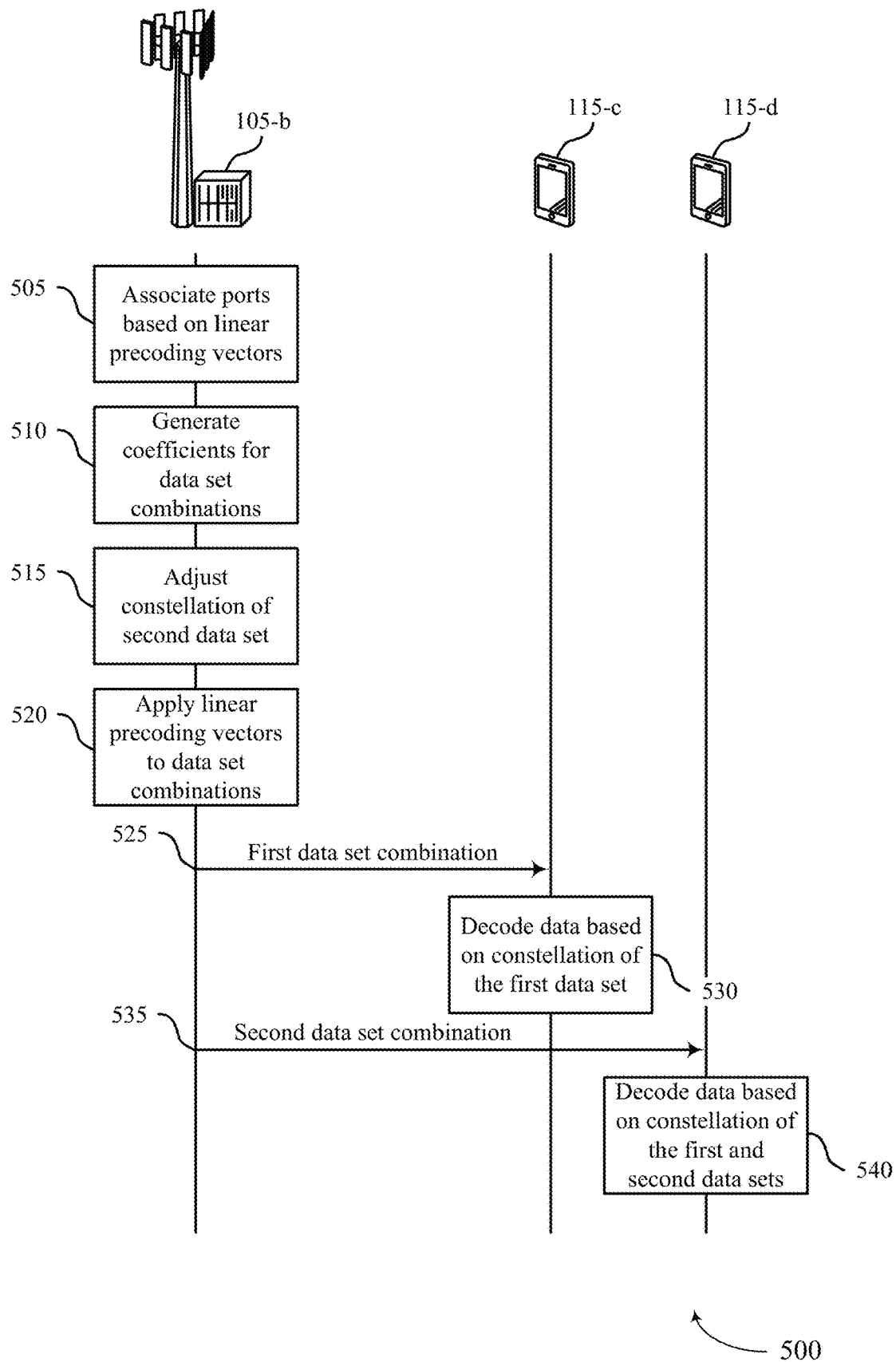
FIG. 5 illustrates an example of a process flow that supports non-linear precoding for MU-MIMO communications in accordance with aspects of the present disclosure.

FIG. 5 illustrates an example of a process flow 500 that supports non-linear precoding for MU-MIMO communications in accordance with aspects of the present disclosure. The process flow 500 may implement aspects of wireless communications system 100, or may be implemented by aspects of the wireless communications system 100. For example, the process flow 500 may illustrate operations between a base station 105-b, a UE 115-c, and a UE 115-d, which may be examples of corresponding devices described herein. In the following description of the process flow 500, the operations between the base station 105-b, the UE 115-c, and the UE 115-d may be transmitted in a different order than the example order shown, or the operations performed by the base station 105-b, the UE 115-c, and the UE 115-d may be performed in different orders or at different times. Some operations may also be omitted from the process flow 500, and other operations may be added to the process flow 500.

At 505, the base station 105-b may associate a first port with a set of antenna elements of an antenna array and a second port with of the set of antenna elements of the antenna array. In some examples, the first port may be based on a first linear precoding vector and may have a first phase, and the second port may be based on a second linear precoding vector and a phase shift such that the second port may have a second phase that is coherent with (e.g., constructively interferes with) the first phase. The linear precoding vectors may be calculated from an LQ decomposition of a propagation channel (e.g., an MU-MIMO channel) to create a precoded channel.

In some examples, the base station 105-b may use a component constellation of a first data set (e.g., $u_1$) and a component constellation of a second data set (e.g., $u_2$) to communicate data to the UE 115-c and the UE 115-d, respectively. At 510, the base station 105-b may generate, based on one or more channel metrics, a first set of coefficients indicating a first combination of the first data set and the second data set and a second set of coefficients indicating a second combination of the first data set and the second data set. For example, the first and second sets of coefficients (e.g., $\alpha_{ij}$) may be in a linear transformation matrix, which the base station 105-b may apply to the component constellations of the first and second data sets (e.g., $u_1$ and $u_2$), which may result in a linear combination of contributions from each component constellation to each UE 115. In some cases, the base station 105-b may generate the coefficients by applying a neural network whose inputs may be the one or more channel metrics.

At 515, the base station 105-b may adjust the component constellation of the second data set based on a first data set. For example, the base station 105-b may use a particular constellation point from the component constellation of the first data set to transmit a particular message to the UE 115-c. Based on using the particular constellation point for the transmission to the UE 115-c, the base station 105-b may use (e.g., adjust) a particular constellation point of a particular component constellation of the second data set to transmit a particular message to the UE 115-d.

At 520, the base station 105-b may apply the first linear precoding vector to a first input that includes the first combination of the first data set for the UE 115-c and the second data set for the UE 115-d, and the base station 105-b may apply the second linear precoding vector to a second input that includes the second combination of the first data set and the second data set. The first input and the second input may be the resulting linear combinations of contributions based on applying the coefficients to the component constellations of the first and second data sets. In some examples, the base station 105-b may apply the linear precoding to the first input and the second input to form a precoded channel (e.g., a two-by-two spatially-causal channel) for transmissions to the UE 115-c and the UE 115-d.

At 525, the base station 105-b may transmit, using a first transmission beam corresponding to the first port, the first combination of the first data set for the UE 115-c and the second data set for the UE 115-d. In some examples, the base station 105-b may transmit on a first portion of the precoded channel generated by applying the first linear precoding vector to a propagation channel, where the propagation channel may be a two-by-Nt propagation channel matrix (e.g., where Nt may represent a number of physical antennas associated with the channel).

At 530, the UE 115-c may decode the first data set based on the component constellation of the first data set (e.g., $u_1$). For example, the UE 115-c may decode a particular message (e.g., message 0, message 1, message 2, message 3) based on a constellation point (e.g., 0, 1, 2, 3) of the component constellation of the first data set the base station 105-b uses to transmit the first combination.

At 535, the base station 105-b may transmit, using a second transmission beam corresponding to the second port, the second combination of the first data set for the UE 115-c and the second data set for the UE 115-d. In some examples, the base station 105-b may transmit on a second portion of the precoded channel generated by applying the second linear precoding vector to a propagation channel, where the propagation channel may be the two-by-Nt propagation channel matrix.

At 540, the UE 115-d may decode the second data set based on the component constellation of the first data set (e.g., $u_1$) and the component constellation of the second data set (e.g., $u_2$). For example, the UE 115-d may decode a particular message (e.g., message 0, message 1, message 2, message 3) based on a constellation point (e.g., 0, 1, 2, 3) of the component constellation of the second data set the base station 105-b uses to transmit the second combination. Additionally or alternatively, the UE 115-d may decode the particular message based on which message and corresponding constellation point the base station 105-b transmitted to the UE 115-c.

Figure 6:
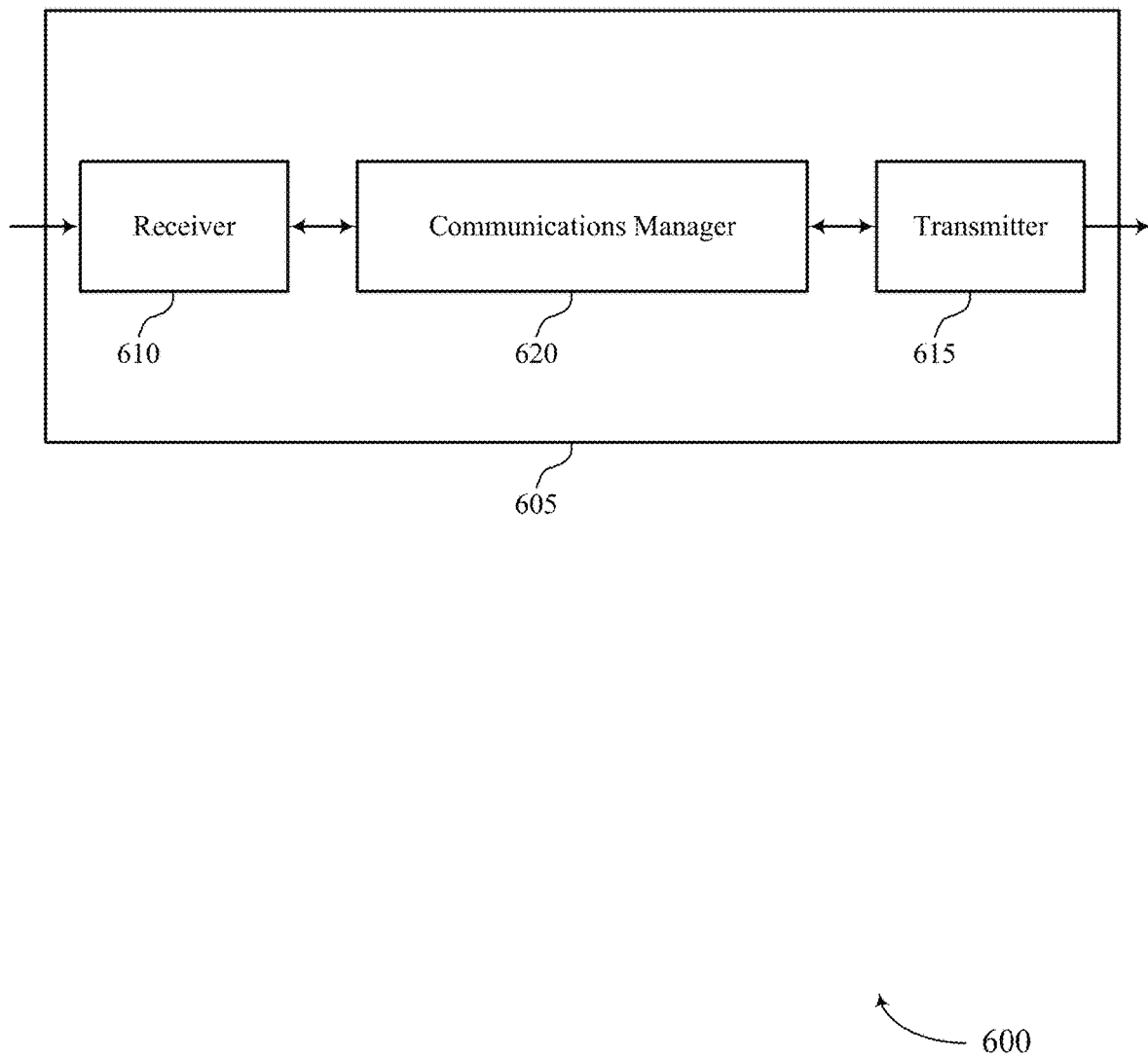
FIGS. 6 and 7 show block diagrams of devices that support non-linear precoding for MU-MIMO communications in accordance with aspects of the present disclosure.

FIG. 6 shows a block diagram 600 of a device 605 that supports non-linear precoding for MU-MIMO communications in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to non-linear precoding for MU-MIMO communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to non-linear precoding for MU-MIMO communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of non-linear precoding for MU-MIMO communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

For example, the communications manager 620 may be configured as or otherwise support a means for associating a first port with multiple antenna elements of an antenna array, the first port based on a first linear precoding vector and having a first phase. The communications manager 620 may be configured as or otherwise support a means for associating a second port with the multiple antenna elements of the antenna array, the second port based on a second linear precoding vector and a phase shift such that the second port has a second phase that is coherent with the first phase. The communications manager 620 may be configured as or otherwise support a means for applying the first linear precoding vector to a first input that includes a first combination of a first data set for a first UE and a second data set for a second UE. The communications manager 620 may be configured as or otherwise support a means for applying the second linear precoding vector to a second input that includes a second combination of the first data set for the first UE and the second data set for the second UE. The communications manager 620 may be configured as or otherwise support a means for transmitting, using a first transmission beam corresponding to the first port and a second transmission beam corresponding to the second port, the first combination and the second combination.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for non-linear precoding for MU-MIMO communications, which may improve the reliability of data reception for transmissions to two UEs.

Figure 7:
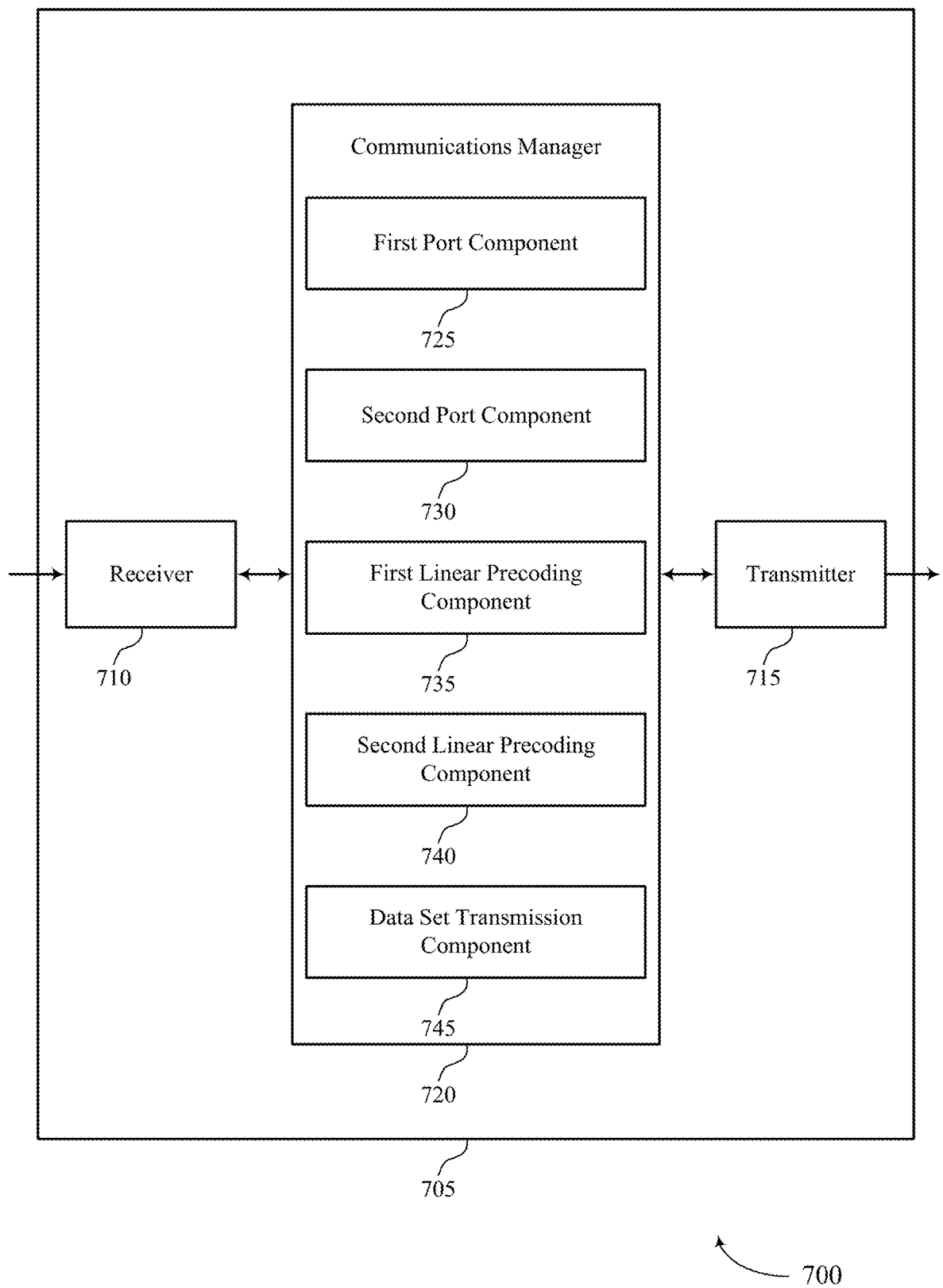

FIG. 7 shows a block diagram 700 of a device 705 that supports non-linear precoding for MU-MIMO communications in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to non-linear precoding for MU-MIMO communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to non-linear precoding for MU-MIMO communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of non-linear precoding for MU-MIMO communications as described herein. For example, the communications manager 720 may include a first port component 725, a second port component 730, a first linear precoding component 735, a second linear precoding component 740, a data set transmission component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The first port component 725 may be configured as or otherwise support a means for associating a first port with multiple antenna elements of an antenna array, the first port based on a first linear precoding vector and having a first phase. The second port component 730 may be configured as or otherwise support a means for associating a second port with the multiple antenna elements of the antenna array, the second port based on a second linear precoding vector and a phase shift such that the second port has a second phase that is coherent with the first phase. The first linear precoding component 735 may be configured as or otherwise support a means for applying the first linear precoding vector to a first input that includes a first combination of a first data set for a first UE and a second data set for a second UE. The second linear precoding component 740 may be configured as or otherwise support a means for applying the second linear precoding vector to a second input that includes a second combination of the first data set for the first UE and the second data set for the second UE. The data set transmission component 745 may be configured as or otherwise support a means for transmitting, using a first transmission beam corresponding to the first port and a second transmission beam corresponding to the second port, the first combination and the second combination.

Figure 8:
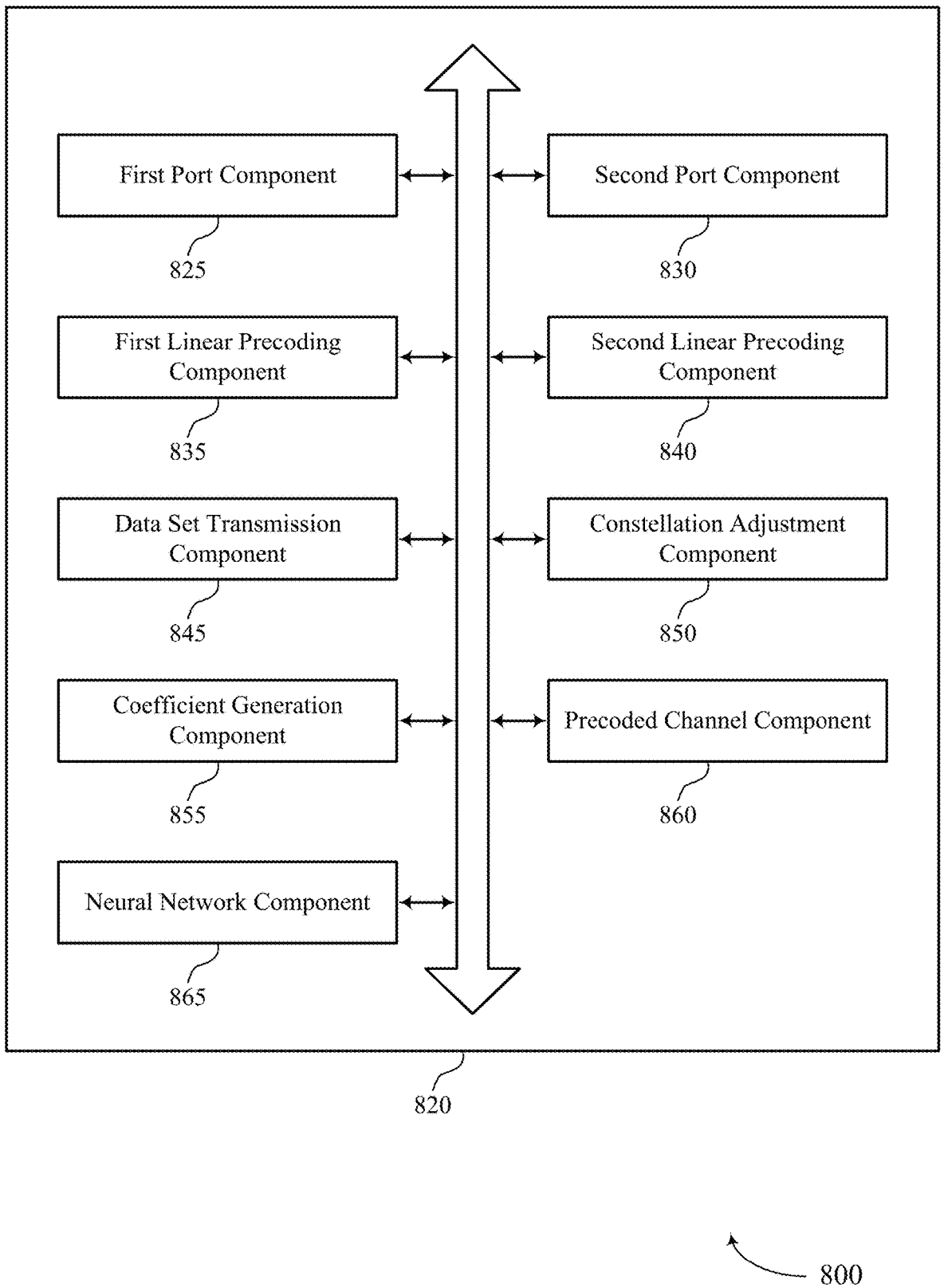
FIG. 8 shows a block diagram of a communications manager that supports non-linear precoding for MU-MIMO communications in accordance with aspects of the present disclosure.

FIG. 8 shows a block diagram 800 of a communications manager 820 that supports non-linear precoding for MU-MIMO communications in accordance with aspects of the present disclosure. The communications manager 820 may be an example of aspects of a communications manager 620, a communications manager 720, or both, as described herein. The communications manager 820, or various components thereof, may be an example of means for performing various aspects of non-linear precoding for MU-MIMO communications as described herein. For example, the communications manager 820 may include a first port component 825, a second port component 830, a first linear precoding component 835, a second linear precoding component 840, a data set transmission component 845, a constellation adjustment component 850, a coefficient generation component 855, a precoded channel component 860, a neural network component 865, or any combination thereof. Each of these components may communicate, directly or indirectly, with one another (e.g., via one or more buses).

The first port component 825 may be configured as or otherwise support a means for associating a first port with multiple antenna elements of an antenna array, the first port based on a first linear precoding vector and having a first phase. The second port component 830 may be configured as or otherwise support a means for associating a second port with the multiple antenna elements of the antenna array, the second port based on a second linear precoding vector and a phase shift such that the second port has a second phase that is coherent with the first phase. The first linear precoding component 835 may be configured as or otherwise support a means for applying the first linear precoding vector to a first input that includes a first combination of a first data set for a first UE and a second data set for a second UE. The second linear precoding component 840 may be configured as or otherwise support a means for applying the second linear precoding vector to a second input that includes a second combination of the first data set for the first UE and the second data set for the second UE. The data set transmission component 845 may be configured as or otherwise support a means for transmitting, using a first transmission beam corresponding to the first port and a second transmission beam corresponding to the second port, the first combination and the second combination.

In some examples, the first transmission beam constructively interferes with the second transmission beam based on the second phase of the second port being coherent with the first phase of the first port. In some examples, the constellation adjustment component 850 may be configured as or otherwise support a means for adjusting a constellation of the second data set based on the first data set.

In some examples, to support adjusting, the constellation adjustment component 850 may be configured as or otherwise support a means for adjusting a constellation of each symbol of the second data set based on a corresponding value indicated by each respective symbol of the first data set.

In some examples, a first constellation of the first data set includes a first QPSK constellation. In some examples, the constellation of the second data set is a second constellation and includes a second QPSK constellation, where the adjusting of the second constellation of the second data set includes adjusting a labeling of the second QPSK constellation based on the first data set.

In some examples, the coefficient generation component 855 may be configured as or otherwise support a means for generating, based on one or more channel metrics, a first set of coefficients indicating the first combination of the first data set and the second data set, where the applying of the first linear precoding vector is based on the generating of the first set of coefficients. In some examples, the coefficient generation component 855 may be configured as or otherwise support a means for generating, based on the one or more channel metrics, a second set of coefficients indicating the second combination of the first data set and the second data set, where the applying of the second linear precoding vector is based on the generating of the second set of coefficients.

In some examples, the generating of the first set of coefficients and the generating of the second set of coefficients are based on an application of a neural network whose inputs include the one or more channel metrics.

In some examples, the one or more channel metrics includes an estimate of a downlink precoded channel, a downlink SNR, a noise covariance expected at the downlink precoded channel, or a combination thereof.

In some examples, to support transmitting, the precoded channel component 860 may be configured as or otherwise support a means for transmitting, using the first transmission beam corresponding to the first port, on a first portion of a precoded channel generated by applying the first linear precoding vector to a propagation channel. In some examples, to support transmitting, the precoded channel component 860 may be configured as or otherwise support a means for transmitting, using the second transmission beam corresponding to the second port, on a second portion of the precoded channel generated by applying the second linear precoding vector to the propagation channel. In some examples, the precoded channel is a two-by-two spatially-causal channel based on the second port having the second phase that is coherent with the first phase.

Figure 9:
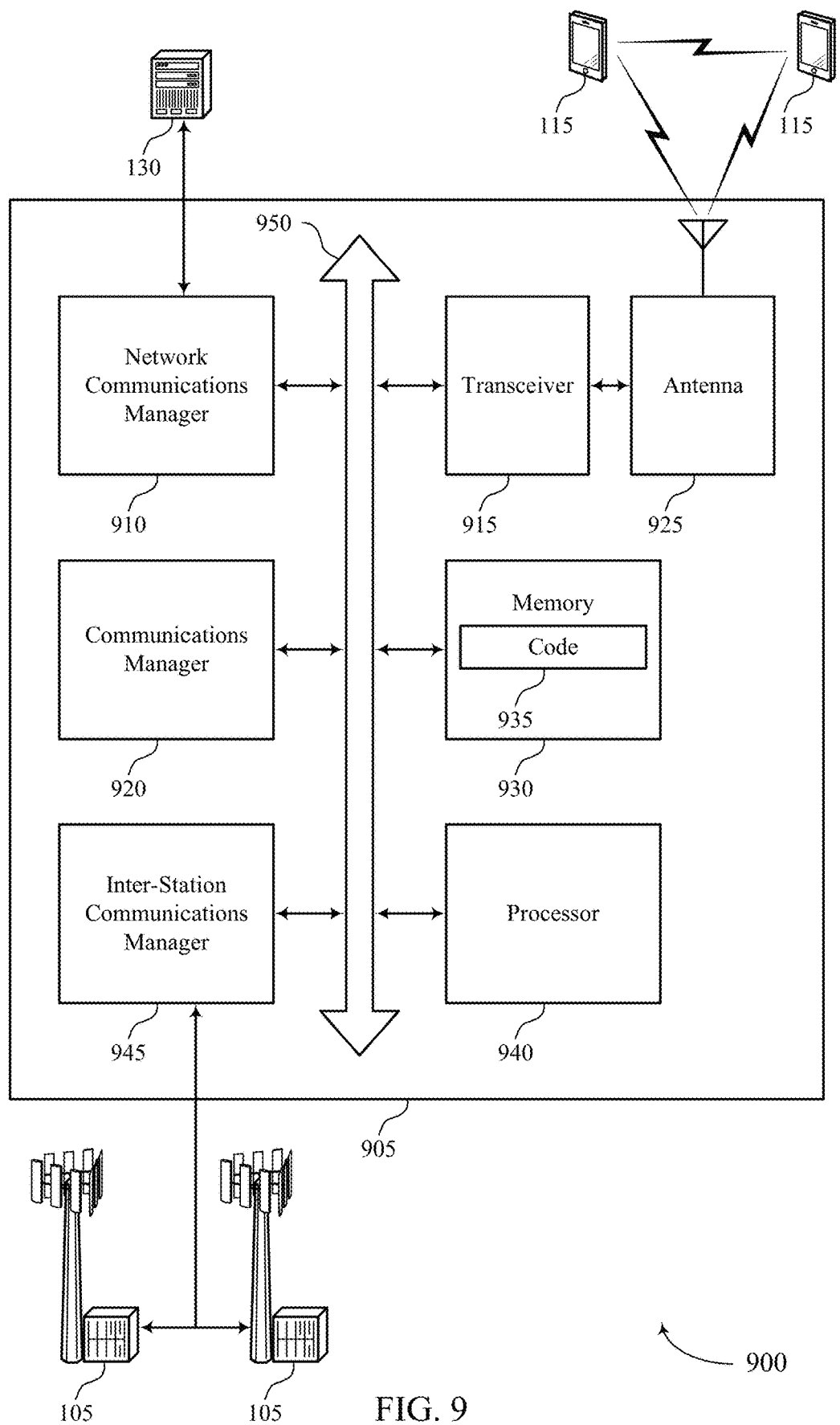
FIG. 9 shows a diagram of a system including a device that supports non-linear precoding for MU-MIMO communications in accordance with aspects of the present disclosure.

FIG. 9 shows a diagram of a system 900 including a device 905 that supports non-linear precoding for MU-MIMO communications in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random-access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting non-linear precoding for MU-MIMO communications). For example, the device 905 or a component of the device 905 may include a processor 940 and memory 930 coupled with the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

For example, the communications manager 920 may be configured as or otherwise support a means for associating a first port with multiple antenna elements of an antenna array, the first port based on a first linear precoding vector and having a first phase. The communications manager 920 may be configured as or otherwise support a means for associating a second port with the multiple antenna elements of the antenna array, the second port based on a second linear precoding vector and a phase shift such that the second port has a second phase that is coherent with the first phase. The communications manager 920 may be configured as or otherwise support a means for applying the first linear precoding vector to a first input that includes a first combination of a first data set for a first UE and a second data set for a second UE. The communications manager 920 may be configured as or otherwise support a means for applying the second linear precoding vector to a second input that includes a second combination of the first data set for the first UE and the second data set for the second UE. The communications manager 920 may be configured as or otherwise support a means for transmitting, using a first transmission beam corresponding to the first port and a second transmission beam corresponding to the second port, the first combination and the second combination.

By including or configuring the communications manager 920 in accordance with examples as described herein, the device 905 may support techniques for non-linear precoding for MU-MIMO communications, which may improve the reliability of data reception for transmissions to two UEs.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of non-linear precoding for MU-MIMO communications as described herein, or the processor 940 and the memory 930 may be otherwise configured to perform or support such operations.

Figure 10:
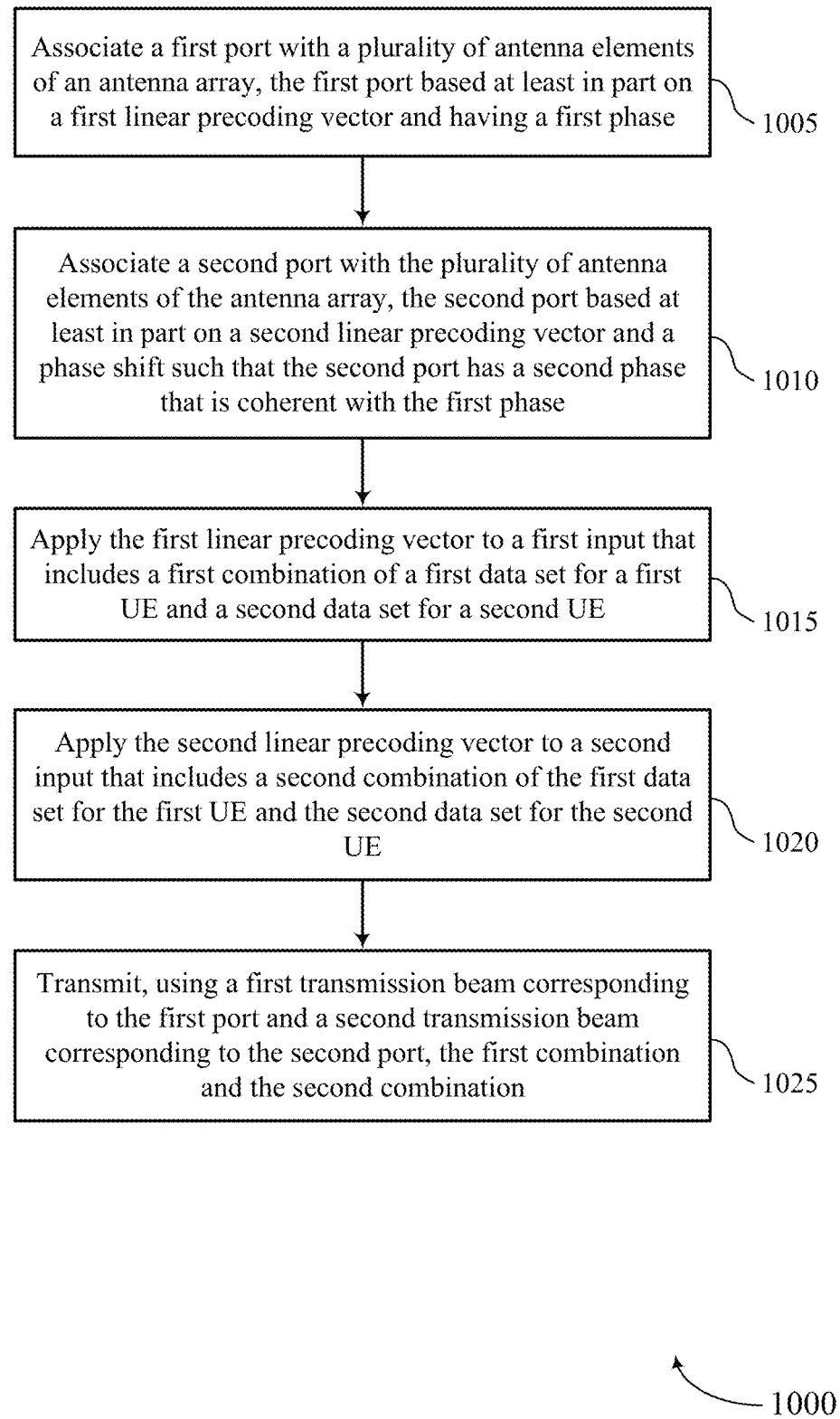
FIGS. 10 through 13 show flowcharts illustrating methods that support non-linear precoding for MU-MIMO communications in accordance with aspects of the present disclosure.

FIG. 10 shows a flowchart illustrating a method 1000 that supports non-linear precoding for MU-MIMO communications in accordance with aspects of the present disclosure. The operations of the method 1000 may be implemented by a base station or its components as described herein. For example, the operations of the method 1000 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1005, the method may include associating a first port with multiple antenna elements of an antenna array, the first port based on a first linear precoding vector and having a first phase. The operations of 1005 may be performed in accordance with examples as disclosed herein. In some examples, aspects of the operations of 1005 may be performed by a first port component 825 as described with reference to FIG. 8.

At 1010, the method may include associating a second port with the multiple antenna elements of the antenna array, the second port based on a second linear precoding vector and a phase shift such that the second port has a second phase that is coherent with the first phase. The operations of 1010 may be performed in accordance with examples as disclosed herein. In some examples, aspects of the operations of 1010 may be performed by a second port component 830 as described with reference to FIG. 8.

At 1015, the method may include applying the first linear precoding vector to a first input that includes a first combination of a first data set for a first UE and a second data set for a second UE. The operations of 1015 may be performed in accordance with examples as disclosed herein. In some examples, aspects of the operations of 1015 may be performed by a first linear precoding component 835 as described with reference to FIG. 8.

At 1020, the method may include applying the second linear precoding vector to a second input that includes a second combination of the first data set for the first UE and the second data set for the second UE. The operations of 1020 may be performed in accordance with examples as disclosed herein. In some examples, aspects of the operations of 1020 may be performed by a second linear precoding component 840 as described with reference to FIG. 8.

At 1025, the method may include transmitting, using a first transmission beam corresponding to the first port and a second transmission beam corresponding to the second port, the first combination and the second combination. The operations of 1025 may be performed in accordance with examples as disclosed herein. In some examples, aspects of the operations of 1025 may be performed by a data set transmission component 845 as described with reference to FIG. 8.

Figure 11:
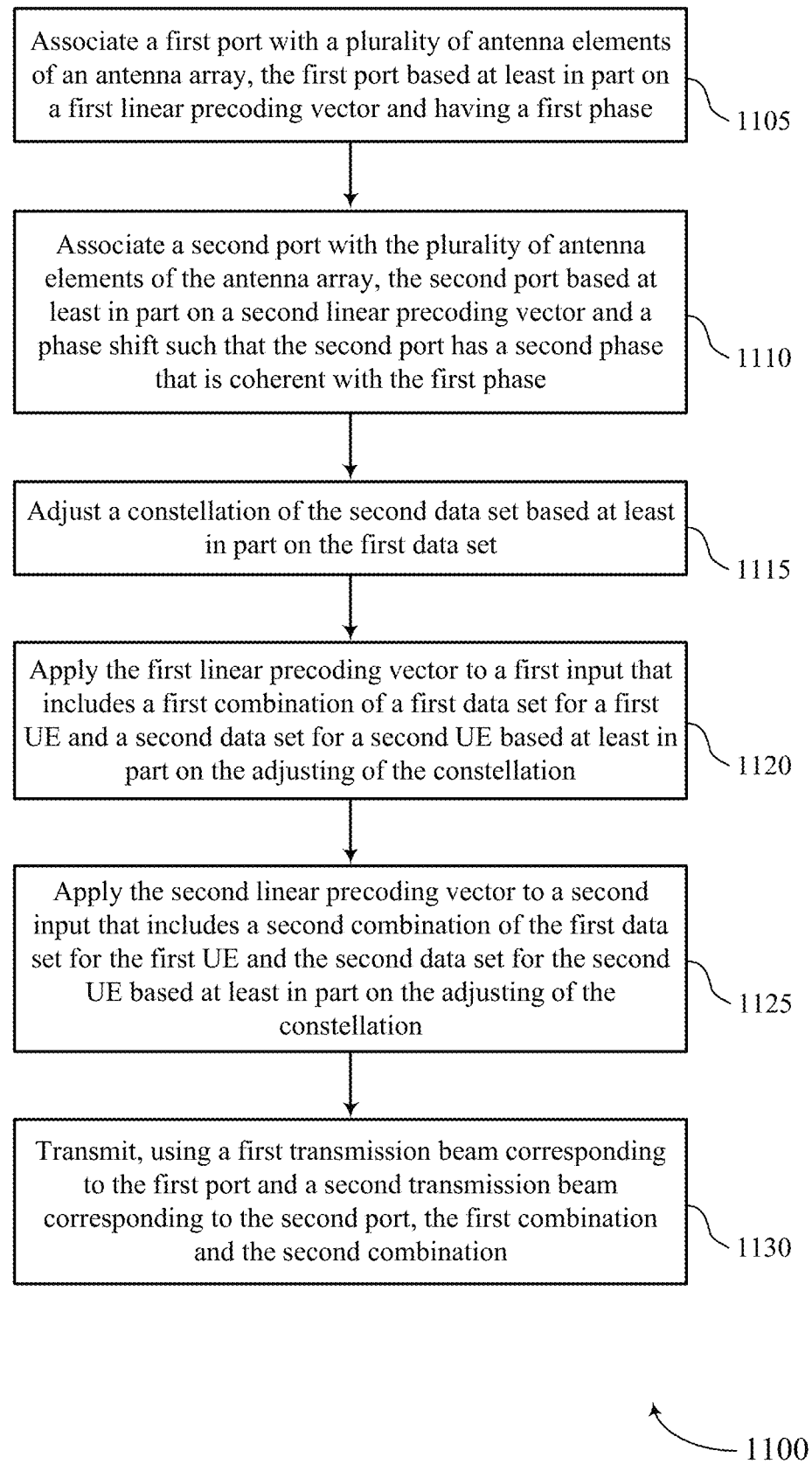

FIG. 11 shows a flowchart illustrating a method 1100 that supports non-linear precoding for MU-MIMO communications in accordance with aspects of the present disclosure. The operations of the method 1100 may be implemented by a base station or its components as described herein. For example, the operations of the method 1100 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1105, the method may include associating a first port with multiple antenna elements of an antenna array, the first port based on a first linear precoding vector and having a first phase. The operations of 1105 may be performed in accordance with examples as disclosed herein. In some examples, aspects of the operations of 1105 may be performed by a first port component 825 as described with reference to FIG. 8.

At 1110, the method may include associating a second port with the multiple antenna elements of the antenna array, the second port based on a second linear precoding vector and a phase shift such that the second port has a second phase that is coherent with the first phase. The operations of 1110 may be performed in accordance with examples as disclosed herein. In some examples, aspects of the operations of 1110 may be performed by a second port component 830 as described with reference to FIG. 8.

At 1115, the method may include adjusting a constellation of the second data set based on the first data set. The operations of 1115 may be performed in accordance with examples as disclosed herein. In some examples, aspects of the operations of 1115 may be performed by a constellation adjustment component 850 as described with reference to FIG. 8.

At 1120, the method may include applying the first linear precoding vector to a first input that includes a first combination of a first data set for a first UE and a second data set for a second UE based on the adjusting of the constellation. The operations of 1120 may be performed in accordance with examples as disclosed herein. In some examples, aspects of the operations of 1120 may be performed by a first linear precoding component 835 as described with reference to FIG. 8.

At 1125, the method may include applying the second linear precoding vector to a second input that includes a second combination of the first data set for the first UE and the second data set for the second UE based on the adjusting of the constellation. The operations of 1125 may be performed in accordance with examples as disclosed herein. In some examples, aspects of the operations of 1125 may be performed by a second linear precoding component 840 as described with reference to FIG. 8.

At 1130, the method may include transmitting, using a first transmission beam corresponding to the first port and a second transmission beam corresponding to the second port, the first combination and the second combination. The operations of 1130 may be performed in accordance with examples as disclosed herein. In some examples, aspects of the operations of 1130 may be performed by a data set transmission component 845 as described with reference to FIG. 8.

Figure 12:
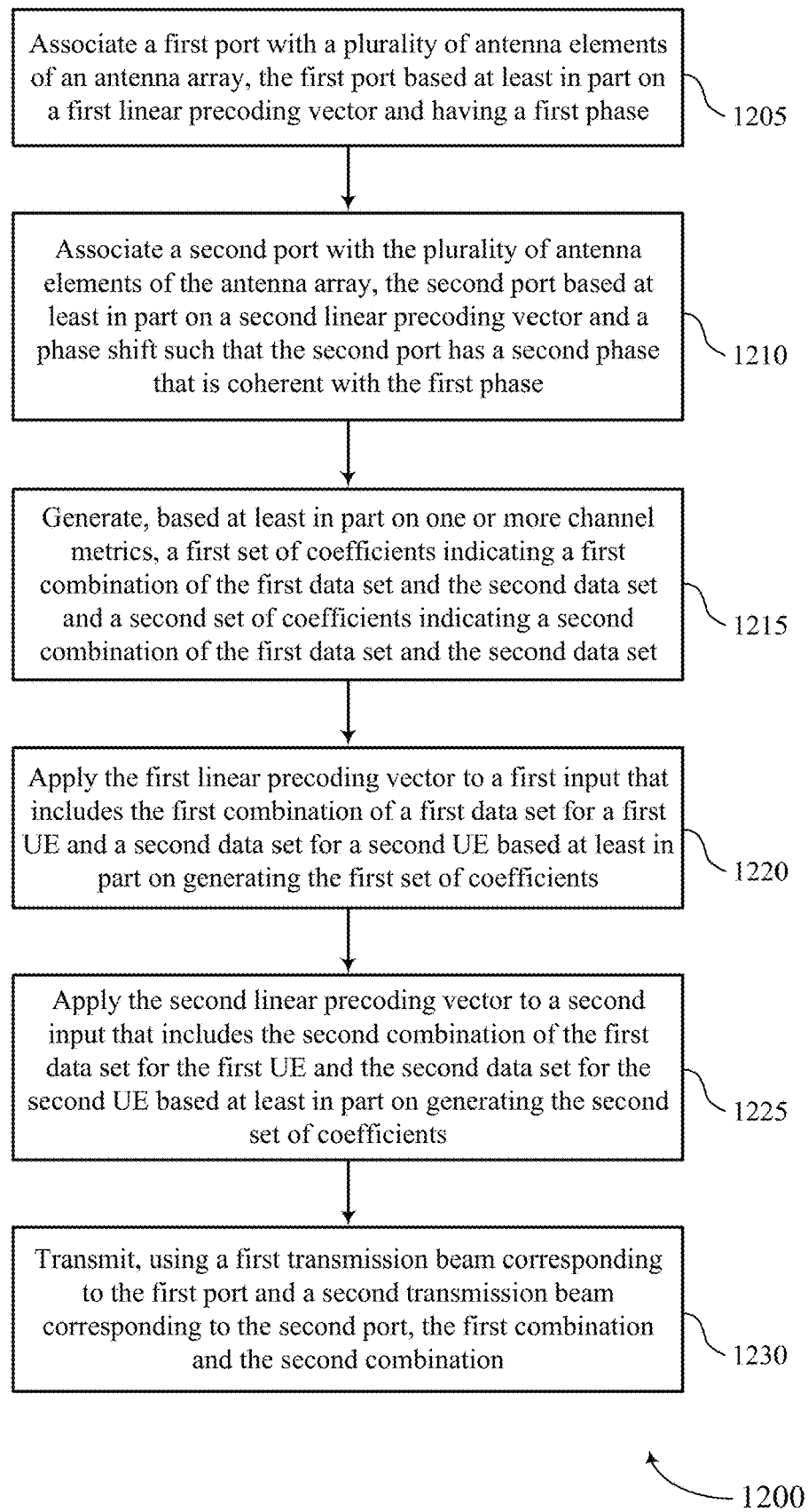

FIG. 12 shows a flowchart illustrating a method 1200 that supports non-linear precoding for MU-MIMO communications in accordance with aspects of the present disclosure. The operations of the method 1200 may be implemented by a base station or its components as described herein. For example, the operations of the method 1200 may be performed by a base station 105 as described with reference to FIGS. 1 through 9. In some examples, a base station may execute a set of instructions to control the functional elements of the base station to perform the described functions.

Additionally or alternatively, the base station may perform aspects of the described functions using special-purpose hardware.

At 1205, the method may include associating a first port with multiple antenna elements of an antenna array, the first port based on a first linear precoding vector and having a first phase. The operations of 1205 may be performed in accordance with examples as disclosed herein. In some examples, aspects of the operations of 1205 may be performed by a first port component 825 as described with reference to FIG. 8.

At 1210, the method may include associating a second port with the multiple antenna elements of the antenna array, the second port based on a second linear precoding vector and a phase shift such that the second port has a second phase that is coherent with the first phase. The operations of 1210 may be performed in accordance with examples as disclosed herein. In some examples, aspects of the operations of 1210 may be performed by a second port component 830 as described with reference to FIG. 8.

At 1215, the method may include generating, based on one or more channel metrics, a first set of coefficients indicating a first combination of the first data set and the second data set and a second set of coefficients indicating a second combination of the first data set and the second data set. The operations of 1215 may be performed in accordance with examples as disclosed herein. In some examples, aspects of the operations of 1215 may be performed by a coefficient generation component 855 as described with reference to FIG. 8.

At 1220, the method may include applying the first linear precoding vector to a first input that includes the first combination of a first data set for a first UE and a second data set for a second UE based on the generating of the first set of coefficients. The operations of 1220 may be performed in accordance with examples as disclosed herein. In some examples, aspects of the operations of 1220 may be performed by a first linear precoding component 835 as described with reference to FIG. 8.

At 1225, the method may include applying the second linear precoding vector to a second input that includes the second combination of the first data set for the first UE and the second data set for the second UE based on the generating of the second set of coefficients. The operations of 1225 may be performed in accordance with examples as disclosed herein. In some examples, aspects of the operations of 1225 may be performed by a second linear precoding component 840 as described with reference to FIG. 8.

At 1230, the method may include transmitting, using a first transmission beam corresponding to the first port and a second transmission beam corresponding to the second port, the first combination and the second combination. The operations of 1230 may be performed in accordance with examples as disclosed herein. In some examples, aspects of the operations of 1230 may be performed by a data set transmission component 845 as described with reference to FIG. 8.

Figure 13:
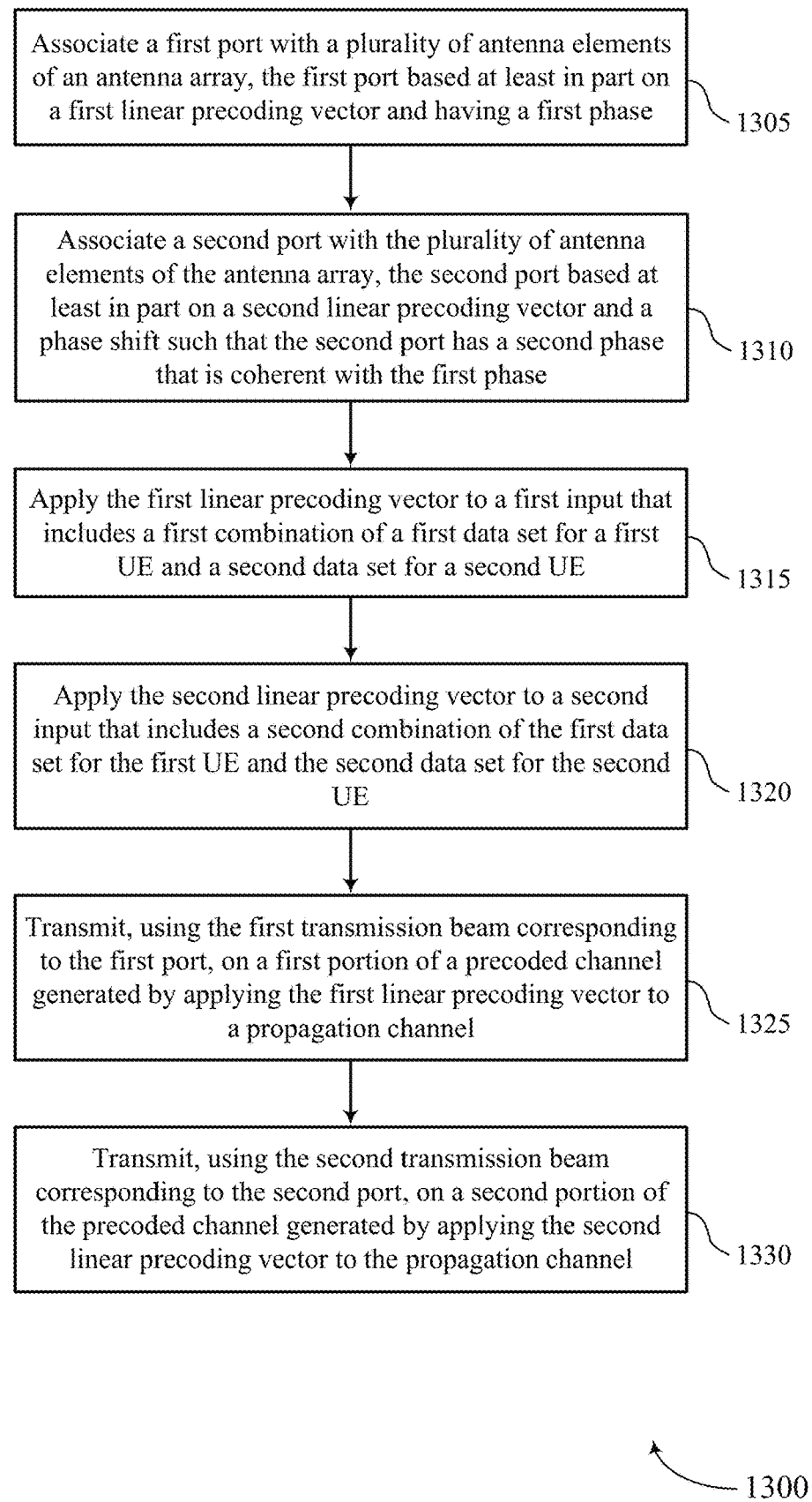

FIG. 13 shows a flowchart illustrating a method 1300 that supports non-linear precoding for MU-MIMO communications in accordance with aspects of the present disclosure. The operations of the method 1300 may be implemented by a base station or its components as described herein. For example, the operations of the method 1300 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1305, the method may include associating a first port with multiple antenna elements of an antenna array, the first port based on a first linear precoding vector and having a first phase. The operations of 1305 may be performed in accordance with examples as disclosed herein. In some examples, aspects of the operations of 1305 may be performed by a first port component 825 as described with reference to FIG. 8.

At 1310, the method may include associating a second port with the multiple antenna elements of the antenna array, the second port based on a second linear precoding vector and a phase shift such that the second port has a second phase that is coherent with the first phase. The operations of 1310 may be performed in accordance with examples as disclosed herein. In some examples, aspects of the operations of 1310 may be performed by a second port component 830 as described with reference to FIG. 8.

At 1315, the method may include applying the first linear precoding vector to a first input that includes a first combination of a first data set for a first UE and a second data set for a second UE. The operations of 1315 may be performed in accordance with examples as disclosed herein. In some examples, aspects of the operations of 1315 may be performed by a first linear precoding component 835 as described with reference to FIG. 8.

At 1320, the method may include applying the second linear precoding vector to a second input that includes a second combination of the first data set for the first UE and the second data set for the second UE. The operations of 1320 may be performed in accordance with examples as disclosed herein. In some examples, aspects of the operations of 1320 may be performed by a second linear precoding component 840 as described with reference to FIG. 8.

At 1325, the method may include transmitting, using the first transmission beam corresponding to the first port, on a first portion of a precoded channel generated by applying the first linear precoding vector to a propagation channel. The operations of 1325 may be performed in accordance with examples as disclosed herein. In some examples, aspects of the operations of 1325 may be performed by a precoded channel component 860 as described with reference to FIG. 8.

At 1330, the method may include transmitting, using the second transmission beam corresponding to the second port, on a second portion of the precoded channel generated by applying the second linear precoding vector to the propagation channel. The operations of 1330 may be performed in accordance with examples as disclosed herein. In some examples, aspects of the operations of 1330 may be performed by a precoded channel component 860 as described with reference to FIG. 8.

The following provides an overview of aspects of the present disclosure:

Aspect 1: A method of wireless communications at a base station, comprising: associating a first port with a plurality of antenna elements of an antenna array, the first port based at least in part on a first linear precoding vector and having a first phase; associating a second port with the plurality of antenna elements of the antenna array, the second port based at least in part on a second linear precoding vector and a phase shift such that the second port has a second phase that is coherent with the first phase; applying the first linear precoding vector to a first input that includes a first combination of a first data set for a first UE and a second data set for a second UE; applying the second linear precoding vector to a second input that includes a second combination of the first data set for the first UE and the second data set for the second UE; and transmitting, using a first transmission beam corresponding to the first port and a second transmission beam corresponding to the second port, the first combination and the second combination.

Aspect 2: The method of aspect 1, wherein the first transmission beam constructively interferes with the second transmission beam based at least in part on the second phase of the second port being coherent with the first phase of the first port.

Aspect 3: The method of any of aspects 1 through 2, further comprising: adjusting a constellation of the second data set based at least in part on the first data set.

Aspect 4: The method of aspect 3, wherein the adjusting comprises: adjusting a constellation of each symbol of the second data set based at least in part on a corresponding value indicated by each respective symbol of the first data set.

Aspect 5: The method of any of aspects 3 through 4, wherein a first constellation of the first data set comprises a first QPSK constellation; and the constellation of the second data set is a second constellation and comprises a second QPSK constellation, wherein the adjusting of the second constellation of the second data set comprises adjusting a labeling of the second QPSK constellation based at least in part on the first data set.

Aspect 6: The method of any of aspects 1 through 5, further comprising: generating, based at least in part on one or more channel metrics, a first set of coefficients indicating the first combination of the first data set and the second data set, wherein the applying of the first linear precoding vector is based at least in part on the generating of the first set of coefficients; and generating, based at least in part on the one or more channel metrics, a second set of coefficients indicating the second combination of the first data set and the second data set, wherein the applying of the second linear precoding vector is based at least in part on the generating of the second set of coefficients.

Aspect 7: The method of aspect 6, wherein the generating of the first set of coefficients and the generating of the second set of coefficients are based at least in part on an application of a neural network whose inputs include the one or more channel metrics.

Aspect 8: The method of any of aspects 6 through 7, wherein the one or more channel metrics comprises an estimate of a downlink precoded channel, a downlink SNR, a noise covariance expected at the downlink precoded channel, or a combination thereof.

Aspect 9: The method of any of aspects 1 through 8, wherein the transmitting further comprises: transmitting, using the first transmission beam corresponding to the first port, on a first portion of a precoded channel generated by applying the first linear precoding vector to a propagation channel; and transmitting, using the second transmission beam corresponding to the second port, on a second portion of the precoded channel generated by applying the second linear precoding vector to the propagation channel.

Aspect 10: The method of aspect 9, wherein the precoded channel is a two-by-two spatially-causal channel based at least in part on the second port having the second phase that is coherent with the first phase.

Aspect 11: An apparatus comprising a processor; memory coupled with the processor; and instructions stored in the memory and executable by the processor to cause the apparatus to perform a method of any of aspects 1 through 10.

Aspect 12: An apparatus comprising at least one means for performing a method of any of aspects 1 through 10.

Aspect 13: A non-transitory computer-readable medium storing code the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a base station, comprising:
    associating a first port with a plurality of antenna elements of an antenna array, the first port based at least in part on a first linear precoding vector and having a first phase;
    associating a second port with the plurality of antenna elements of the antenna array, the second port based at least in part on a second linear precoding vector and a phase shift such that the second port has a second phase that is coherent with the first phase;
    applying the first linear precoding vector to a first input that includes a first combination of a first data set for a first user equipment (UE) and a second data set for a second UE;
    applying the second linear precoding vector to a second input that includes a second combination of the first data set for the first UE and the second data set for the second UE; and
    transmitting, using a first transmission beam corresponding to the first port and a second transmission beam corresponding to the second port, the first combination and the second combination.

2. The method of claim 1, wherein the first transmission beam constructively interferes with the second transmission beam based at least in part on the second phase of the second port being coherent with the first phase of the first port.

3. The method of claim 1, further comprising:
    adjusting a constellation of the second data set based at least in part on the first data set.

4. The method of claim 3, wherein the adjusting comprises:
    adjusting a constellation of each symbol of the second data set based at least in part on a corresponding value indicated by each respective symbol of the first data set.

5. The method of claim 3, wherein:
    a first constellation of the first data set comprises a first quadrature phase-shift keying constellation; and
    the constellation of the second data set is a second constellation and comprises a second quadrature phase-shift keying constellation, wherein the adjusting of the second constellation of the second data set comprises adjusting a labeling of the second quadrature phase-shift keying constellation based at least in part on the first data set.

6. The method of claim 1, further comprising:
    generating, based at least in part on one or more channel metrics, a first set of coefficients indicating the first combination of the first data set and the second data set, wherein the applying of the first linear precoding vector is based at least in part on the generating of the first set of coefficients; and generating, based at least in part on the one or more channel metrics, a second set of coefficients indicating the second combination of the first data set and the second data set, wherein the applying of the second linear precoding vector is based at least in part on the generating of the second set of coefficients.

7. The method of claim 6, wherein the generating of the first set of coefficients and the generating of the second set of coefficients are based at least in part on an application of a neural network whose inputs include the one or more channel metrics.

8. The method of claim 6, wherein the one or more channel metrics comprises an estimate of a downlink precoded channel, a downlink signal-to-noise ratio, a noise covariance expected at the downlink precoded channel, or a combination thereof.

9. The method of claim 1, wherein the transmitting further comprises:
  transmitting, using the first transmission beam corresponding to the first port, on a first portion of a precoded channel generated by applying the first linear precoding vector to a propagation channel; and
  transmitting, using the second transmission beam corresponding to the second port, on a second portion of the precoded channel generated by applying the second linear precoding vector to the propagation channel.

10. The method of claim 9, wherein the precoded channel is a two-by-two spatially-causal channel based at least in part on the second port having the second phase that is coherent with the first phase.

11. An apparatus, comprising:
  a processor;
  memory coupled with the processor; and
  instructions stored in the memory and operable, when executed by the processor, to cause the apparatus to:
    associate a first port with a plurality of antenna elements of an antenna array, the first port based at least in part on a first linear precoding vector and having a first phase;
    associate a second port with the plurality of antenna elements of the antenna array, the second port based at least in part on a second linear precoding vector and a phase shift such that the second port has a second phase that is coherent with the first phase;
    apply the first linear precoding vector to a first input that includes a first combination of a first data set for a first user equipment (UE) and a second data set for a second UE;
    apply the second linear precoding vector to a second input that includes a second combination of the first data set for the first UE and the second data set for the second UE; and
    transmit, using a first transmission beam corresponding to the first port and a second transmission beam corresponding to the second port, the first combination and the second combination.

12. The apparatus of claim 11, wherein the first transmission beam constructively interferes with the second transmission beam based at least in part on the second phase of the second port being coherent with the first phase of the first port.

13. The apparatus of claim 11, wherein the instructions are further operable, when executed by the processor, to cause the apparatus to:
  adjust a constellation of the second data set based at least in part on the first data set.

14. The apparatus of claim 13, wherein the instructions to adjusting are executable by the processor to cause the apparatus to:
  adjust a constellation of each symbol of the second data set based at least in part on a corresponding value indicated by each respective symbol of the first data set.

15. The apparatus of claim 13, wherein:
  a first constellation of the first data set comprises a first quadrature phase-shift keying constellation; and
  the constellation of the second data set is a second constellation and comprises a second quadrature phase-shift keying constellation, wherein the adjusting of the second constellation of the second data set comprises adjusting a labeling of the second quadrature phase-shift keying constellation based at least in part on the first data set.

16. The apparatus of claim 11, wherein the instructions are further executable by the processor to cause the apparatus to:
  generate, based at least in part on one or more channel metrics, a first set of coefficients indicating the first combination of the first data set and the second data set, wherein the applying of the first linear precoding vector is based at least in part on the generating of the first set of coefficients; and
  generate, based at least in part on the one or more channel metrics, a second set of coefficients indicating the second combination of the first data set and the second data set, wherein the applying of the second linear precoding vector is based at least in part on the generating of the second set of coefficients.

17. The apparatus of claim 16, wherein the generating of the first set of coefficients and the generating of the second set of coefficients are based at least in part on an application of a neural network whose inputs include the one or more channel metrics.

18. The apparatus of claim 16, wherein the one or more channel metrics comprises an estimate of a downlink precoded channel, a downlink signal-to-noise ratio, a noise covariance expected at the downlink precoded channel, or a combination thereof.

19. The apparatus of claim 11, wherein the instructions to transmit are further executable by the processor to cause the apparatus to:
  transmit, using the first transmission beam corresponding to the first port, on a first portion of a precoded channel generated by applying the first linear precoding vector to a propagation channel; and
  transmit, using the second transmission beam corresponding to the second port, on a second portion of the precoded channel generated by applying the second linear precoding vector to the propagation channel.

20. The apparatus of claim 19, wherein the precoded channel is a two-by-two spatially-causal channel based at least in part on the second port having the second phase that is coherent with the first phase.

21. An apparatus, comprising:
  means for associating a first port with a plurality of antenna elements of an antenna array, the first port based at least in part on a first linear precoding vector and having a first phase;
  means for associating a second port with the plurality of antenna elements of the antenna array, the second port based at least in part on a second linear precoding vector and a phase shift such that the second port has a second phase that is coherent with the first phase;

means for applying the first linear precoding vector to a first input that includes a first combination of a first data set for a first user equipment (UE) and a second data set for a second UE;

means for applying the second linear precoding vector to a second input that includes a second combination of the first data set for the first UE and the second data set for the second UE; and means for transmitting, using a first transmission beam corresponding to the first port and a second transmission beam corresponding to the second port, the first combination and the second combination.

22. The apparatus of claim 21, wherein the first transmission beam constructively interferes with the second transmission beam based at least in part on the second phase of the second port being coherent with the first phase of the first port.

23. The apparatus of claim 21, further comprising:
means for adjusting a constellation of the second data set based at least in part on the first data set.

24. The apparatus of claim 23, wherein the means for the adjusting comprise:
means for adjusting a constellation of each symbol of the second data set based at least in part on a corresponding value indicated by each respective symbol of the first data set.

25. The apparatus of claim 23, wherein:
a first constellation of the first data set comprises a first quadrature phase-shift keying constellation; and
the constellation of the second data set is a second constellation and comprises a second quadrature phase-shift keying constellation, wherein the adjusting of the second constellation of the second data set comprises adjusting a labeling of the second quadrature phase-shift keying constellation based at least in part on the first data set.

26. The apparatus of claim 21, further comprising:
means for generating, based at least in part on one or more channel metrics, a first set of coefficients indicating the first combination of the first data set and the second data set, wherein the applying of the first linear precoding vector is based at least in part on the generating of the first set of coefficients; and
means for generating, based at least in part on the one or more channel metrics, a second set of coefficients indicating the second combination of the first data set and the second data set, wherein the applying of the second linear precoding vector is based at least in part on the generating of the second set of coefficients.

27. The apparatus of claim 26, wherein the generating of the first set of coefficients and the generating of the second set of coefficients are based at least in part on an application of a neural network whose inputs include the one or more channel metrics.

28. The apparatus of claim 26, wherein the one or more channel metrics comprises an estimate of a downlink precoded channel, a downlink signal-to-noise ratio, a noise covariance expected at the downlink precoded channel, or a combination thereof.

29. The apparatus of claim 21, wherein the means for the transmitting further comprise:
means for transmitting, using the first transmission beam corresponding to the first port, on a first portion of a precoded channel generated by applying the first linear precoding vector to a propagation channel; and
means for transmitting, using the second transmission beam corresponding to the second port, on a second portion of the precoded channel generated by applying the second linear precoding vector to the propagation channel.

30. A non-transitory computer-readable medium storing code, the code comprising instructions executable by a processor to:
associate a first port with a plurality of antenna elements of an antenna array, the first port based at least in part on a first linear precoding vector and having a first phase;
associate a second port with the plurality of antenna elements of the antenna array, the second port based at least in part on a second linear precoding vector and a phase shift such that the second port has a second phase that is coherent with the first phase;
apply the first linear precoding vector to a first input that includes a first combination of a first data set for a first user equipment (UE) and a second data set for a second UE;
apply the second linear precoding vector to a second input that includes a second combination of the first data set for the first UE and the second data set for the second UE; and
transmit, using a first transmission beam corresponding to the first port and a second transmission beam corresponding to the second port, the first combination and the second combination.

* * * * *